(12) United States Patent
Neubauer et al.

(10) Patent No.: US 9,278,473 B2
(45) Date of Patent: Mar. 8, 2016

(54) EXTRUDER SCREW

(75) Inventors: Anthony C. Neubauer, Piscataway, NJ (US); Neil W. Dunchus, Kinnelon, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 903 days.

(21) Appl. No.: 13/513,343

(22) PCT Filed: Nov. 19, 2010

(86) PCT No.: PCT/US2010/003009
§ 371 (c)(1),
(2), (4) Date: Jun. 1, 2012

(87) PCT Pub. No.: WO2011/068525
PCT Pub. Date: Jun. 9, 2011

(65) Prior Publication Data
US 2012/0238681 A1    Sep. 20, 2012

Related U.S. Application Data

(60) Provisional application No. 61/283,545, filed on Dec. 4, 2009.

(51) Int. Cl.
*B29B 7/88* (2006.01)
*B29C 47/64* (2006.01)
(Continued)

(52) U.S. Cl.
CPC ............. *B29C 47/64* (2013.01); *B29C 47/0021* (2013.01); *B29C 47/0871* (2013.01);
(Continued)

(58) Field of Classification Search
CPC .................. B29C 2947/92628; B29C 47/402; B29C 47/6056; B29C 47/64
See application file for complete search history.

(56) References Cited

U.S. PATENT DOCUMENTS 3,645,992 A   2/1972   Elston
3,917,507 A * 11/1975 Skidmore ...................... 366/75
(Continued)

FOREIGN PATENT DOCUMENTS

EP   0246729   11/1987
EP   1405874    4/2004
(Continued)

OTHER PUBLICATIONS

International Search Report and Written Opinion from related PCT application PCT/US2010003009 dated Apr. 1, 2011, 15 pages.
(Continued)

*Primary Examiner* — Tony G Soohoo
(74) *Attorney, Agent, or Firm* — Brooks, Cameron & Huebsch, PLLC

(57) ABSTRACT

Embodiments of the present disclosure include an extruder screw, (200-1, 200-2) an extruder screw system (254) having a least one of a first extruder screw (200-1, 200-2) and at least one of a second extruder screw, (200-1, 200-2) an extruder system (250) having the extruder screw system (254), a continuous process for the production of an aqueous dispersion using the extruder system, and an aqueous dispersion formed by the process. For the various embodiments, the extruder screw (200-1, 200-2) includes a mixing and melting segment (266); a high internal phase emulsion segment (268) that includes a kneading block having a plurality of disks with surfaces that define a plurality of channels; a distributing and pumping segment (270); a first seal segment (272) between the mixing and melting segment (266) and the high internal phase emulsion segment (268); a second seal segment (274) between the high internal phase emulsion segment (268) and the distributing and pumping segment (270); and a third seal segment (276) at an end distal the distributing and pumping segment (270) relative the high internal phase emulsion segment (268).

19 Claims, 4 Drawing Sheets

(51) Int. Cl.

| | | |
|---|---|---|
| *B29C 47/00* | (2006.01) | |
| *B29C 47/38* | (2006.01) | |
| *B29C 47/40* | (2006.01) | |
| *B29C 47/36* | (2006.01) | |
| B29C 47/08 | (2006.01) | |
| B29C 47/10 | (2006.01) | |
| B29C 47/60 | (2006.01) | |
| B29C 47/82 | (2006.01) | |
| B29K 105/00 | (2006.01) | |

(52) U.S. Cl.
CPC .............. *B29C47/366* (2013.01); *B29C 47/38* (2013.01); *B29C 47/402* (2013.01); *B29C 47/6056* (2013.01); B29C 47/0825 (2013.01); B29C 47/0844 (2013.01); B29C 47/1063 (2013.01); B29C 47/1081 (2013.01); B29C 47/60 (2013.01); B29C 47/82 (2013.01); B29C 2947/92019 (2013.01); B29C 2947/92104 (2013.01); B29C 2947/92123 (2013.01); B29C 2947/92219 (2013.01); B29C 2947/92628 (2013.01); B29C 2947/92695 (2013.01); B29C 2947/92704 (2013.01); B29K 2105/0005 (2013.01)

(56) References Cited

U.S. PATENT DOCUMENTS

| | | | |
|---|---|---|---|
| 4,076,698 A | 2/1978 | Anderson et al. | |
| 4,136,251 A * | 1/1979 | Bice et al. | 366/85 |
| RE30,378 E * | 8/1980 | Bice et al. | 366/85 |
| 4,320,041 A | 3/1982 | Abe et al. | |
| 4,599,392 A | 7/1986 | McKinney et al. | |
| 4,895,688 A * | 1/1990 | Shigetani et al. | 427/391 |
| 4,998,781 A | 3/1991 | Kehl et al. | |
| 5,272,236 A | 12/1993 | Lai et al. | |
| 5,278,272 A | 1/1994 | Lai et al. | |
| 5,354,804 A | 10/1994 | Inada et al. | |
| 5,504,172 A | 4/1996 | Imuta et al. | |
| 5,539,004 A * | 7/1996 | Ikeda et al. | 521/45 |
| 5,938,437 A | 8/1999 | DeVincenzo | |
| 6,048,088 A * | 4/2000 | Haring et al. | 366/85 |
| 6,116,770 A * | 9/2000 | Kiani et al. | 366/82 |
| 6,165,399 A * | 12/2000 | Guntherberg et al. | 366/75 |
| 6,512,024 B1 | 1/2003 | Lundgard et al. | |
| 6,525,157 B2 | 2/2003 | Cozewith et al. | |
| 6,767,956 B2 | 7/2004 | Choudhery et al. | |
| 6,960,635 B2 | 11/2005 | Stevens et al. | |
| 8,608,367 B2 * | 12/2013 | Chung et al. | 366/81 |
| 2001/0031289 A1 * | 10/2001 | Maris | 425/204 |
| 2002/0060378 A1 * | 5/2002 | Miyamoto et al. | 264/211 |
| 2004/0068037 A1 * | 4/2004 | Mitadera et al. | 524/445 |
| 2005/0013192 A1 * | 1/2005 | Kakizaki et al. | 366/82 |
| 2006/0078485 A1 | 4/2006 | Thiele et al. | |
| 2006/0089487 A1 * | 4/2006 | Silvi et al. | 528/481 |
| 2006/0199930 A1 | 9/2006 | Li Pi Shan et al. | |
| 2006/0293457 A1 * | 12/2006 | Nadella et al. | 525/192 |
| 2007/0142618 A1 * | 6/2007 | Davis et al. | 528/310 |
| 2007/0177451 A1 * | 8/2007 | Benjamin et al. | 366/82 |
| 2007/0194478 A1 * | 8/2007 | Aoki et al. | 264/140 |
| 2008/0108756 A1 * | 5/2008 | Walther et al. | 525/196 |
| 2010/0255207 A1 * | 10/2010 | Neubauer et al. | 427/389.9 |
| 2010/0285253 A1 | 11/2010 | Hughes et al. | |
| 2010/0296360 A1 * | 11/2010 | Inagawa et al. | 366/83 |
| 2011/0184089 A1 * | 7/2011 | Bierdel et al. | 366/85 |
| 2012/0070615 A1 * | 3/2012 | Shi et al. | 428/143 |
| 2012/0146292 A1 * | 6/2012 | Ikeda et al. | 277/586 |
| 2012/0235090 A1 * | 9/2012 | Maeda et al. | 252/299.6 |
| 2012/0238681 A1 * | 9/2012 | Neubauer et al. | 366/76.4 |
| 2015/0065616 A1 * | 3/2015 | Brunner et al. | 524/35 |
| 2015/0131399 A1 * | 5/2015 | Brunner et al. | 366/83 |

FOREIGN PATENT DOCUMENTS

| | | | |
|---|---|---|---|
| WO | 00/01745 | | 1/2000 |
| WO | 2005090427 | | 9/2005 |
| WO | 2005095277 | | 10/2005 |
| WO | WO 2009 / 008451 | * | 1/2009 |
| WO | 2009045731 | | 4/2009 |
| WO | 2009051278 | | 4/2009 |

OTHER PUBLICATIONS

International Preliminary Report on Patentability from related PCT application PCT/US2010003009 dated Mar. 13, 2012, 20 pages.

* cited by examiner

EXTRUDER SCREW

This application is a National Stage application under 35 U.S.C. 371 of PCT/US2010/003009, filed on Nov. 19, 2010 and published as WO2011/068525 A1 on Jun. 9, 2011, which claims the benefit of U.S. Provisional Application Ser. No. 61/283,545 filed Dec. 4, 2009, the entire contents of which are incorporated herein by reference in its entirety.

FIELD OF DISCLOSURE

The present disclosure relates to an extruder screw, and in particular to an extruder screw system with the extruder screw for forming an aqueous dispersion.

BACKGROUND

Aqueous dispersions of a thermoplastic resin of various types are known in the art. Aqueous dispersions have been used in a variety of fields since an aqueous dispersion prepared by using water as its dispersion medium can be more advantageous than the dispersions prepared by using an organic solvent for the dispersion medium in view of flammability, working environment, and/or handling convenience. For example, when an aqueous dispersion is applied and dried on a surface of a substrate such as paper, fiber, wood, metal, or plastic molded article, the coating formed can provide the substrate with water resistance, oil resistance, chemical resistance, corrosion resistance and/or heat sealability.

Aqueous dispersions of a thermoplastic resin have been produced by a process wherein a polymerizable monomer which is the resin raw material is polymerized by emulsion polymerization in an aqueous medium in the presence of a dispersing agent. This process is associated with the disadvantage of the limited number of the polymerizable monomers that can be used, and hence, the variety of the aqueous dispersions of the thermoplastic resin that can be produced, is limited. This process also suffers from complicated control of the polymerization reaction as well as intricate equipment.

SUMMARY

The present disclosure includes the following non-limiting embodiments:

Embodiment 1: an extruder screw comprising: a mixing and melting segment; a high internal phase emulsion segment that includes a kneading block having a plurality of disks with surfaces that define a plurality of channels, each of the plurality of disks has a width (e) between opposite substantially parallel major surfaces of each disk that is 2.0% to 8.5% of a nominal inner diameter of an extruder barrel in which the extruder screw system operates, and each of the plurality of channels has a width between disks that is 3.0% to 9.5% of the nominal inner diameter of the extruder barrel; a distributing and pumping segment; a first seal segment between the mixing and melting segment and the high internal phase emulsion segment; a second seal segment between the high internal phase emulsion segment and the distributing and pumping segment; and a third seal segment at an end distal the distributing and pumping segment relative the high internal phase emulsion segment.

Embodiment 2: an extruder screw system, comprising: at least one first extruder screw and at least one second extruder screw, wherein each of the first extruder screw and the second extruder screw include: a mixing and melting segment; a high internal phase emulsion segment that includes a kneading block having a plurality of disks with surfaces that define a plurality of channels, where the plurality of disks of the first extruder screw pass through the plurality of channels of the second screw as the first extruder screw and the second extruder screw rotate relative each other, each of the plurality of disks has a width (e) between opposite substantially parallel major surfaces of each disk that is 2.0% to 8.5% of a nominal inner diameter of an extruder barrel in which the extruder screw system operates, and each of the plurality of channels has a width between disks that is 3.0% to 9.5% of the nominal inner diameter of the extruder barrel; a distributing and pumping segment; a first seal segment between the mixing and melting segment and the high internal phase emulsion segment; a second seal segment between the high internal phase emulsion segment and the distributing and pumping segment; and a third seal segment at an end distal the distributing and pumping segment relative the high internal phase emulsion segment.

Embodiment 3: an extruder system, comprising: a drive mechanism; an extruder barrel having an interior wall that defines a volume, and a first inlet and a second inlet through the interior wall into the volume of the extruder barrel; an extruder screw system having at least one first extruder screw and at least one second extruder screw coupled to the drive mechanism, the first extruder screw and the second extruder screw residing at least partially within the volume defined by the interior wall of the extruder barrel, wherein the drive mechanism rotates the first extruder screw and the second extruder screw, each of the first extruder screw and the second extruder screw including: a mixing and melting segment to provide a mixing and melting zone for the extruder system; a high internal phase emulsion segment that includes a kneading block to provide high internal phase emulsion zone for the extruder system, the kneading block having a plurality of disks with surfaces that define a plurality of channels, where the plurality of disks of the first extruder screw pass through the plurality of channels of the second screw as the drive mechanism rotates the first extruder screw and the second extruder screw relative each other, each of the plurality of disks has a width (e) between opposite substantially parallel major surfaces of each disk that is 2.0% to 8.5% of a nominal inner diameter of an extruder barrel in which the extruder screw system operates, and each of the plurality of channels has a width between disks that is 3.0% to 9.5% of the nominal inner diameter of the extruder barrel; a distributing and pumping segment to provide a dilution zone for the extruder system; a first seal segment between the mixing and melting zone and the high internal phase emulsion zone; a second seal segment between the high internal phase emulsion zone and the dilution zone; and a third seal segment at an end distal the dilution zone relative the high internal phase emulsion zone, wherein the first inlet passes into the high internal phase emulsion zone and the second inlet passes into the dilution zone.

Embodiment 4: a continuous process for the production of an aqueous dispersion, comprising: providing an extruder system according to embodiment 2; introducing one or more base polymers and one or more stabilizing agents into a feed zone of the extruder system; conveying the one or more base polymers and one or more stabilizing agents to a mixing and melting zone of the extruder system; melting blending the one or more base polymers in the mixing and melting zone to provide a molten blend of the one or more base polymers and the one or more stabilizing agents; forming a melt seal in the mixing and melting zone against a first seal zone, the molten blend in the melt seal exerting a predetermined pressure against first seal zone; passing the molten blend under the predetermined pressure through the first seal zone into a high internal phase emulsion zone; injecting water and optionally one or more neutralizing agents into the molten blend in the high internal phase emulsion zone; emulsifying the molten blend and the water optionally in the presence of the neutralizing agent in the high internal phase emulsion zone to form an high internal emulsion; passing the high internal emulsion through a second seal zone into a dilution zone; and diluting the high internal emulsion with additional water in the dilution zone to form the aqueous dispersion.

Embodiment 5: an aqueous dispersion of one or more base polymers and water obtainable by the process of embodiment 3.

Embodiment 6: any one of the embodiments, wherein each of the plurality of disks has an outside diameter that is 110% to 190% of a root diameter of the first extruder screw.

Embodiment 7: any one of the embodiments, wherein the width of each of the plurality of channels is 105% to 400% of the width (e) between opposite substantially parallel major surfaces of each disk.

Embodiment 8: any one of the embodiments, wherein there are at least nine disks for every 30 millimeter length of the kneading block.

Embodiment 9: any one of the embodiments, wherein there are at least seventeen disks for every 60 millimeter length of the kneading block.

Embodiment 10: any one of the embodiments, wherein there are at least twenty-three disks for every 80 millimeter length of the kneading block.

Embodiment 11: any one of the embodiments, wherein the width (e) of each disk is 3 millimeters or less.

Embodiment 12: any one of the embodiments, wherein the width (e) of each disk is 2.5 millimeters or less.

Embodiment 13: any one of the embodiments, wherein the width of each channel is greater than 3 millimeters.

Embodiment 14: any one of the embodiments, wherein each of the plurality of disks is a neutral disk.

Embodiment 15: any one of the embodiments, wherein each of the first seal segment, the second seal segment and the third seal segment includes a restriction ring.

Embodiment 16: any one of the embodiments, wherein emulsifying the molten blend, the water optionally in the presence of the one or more neutralizing agents in the high internal phase emulsion zone to form the high internal emulsion includes using an extruder screw system having at least one first extruder screw and at least one second extruder screw, wherein each of the first extruder screw and the second extruder screw include a high internal phase emulsion segment that includes a kneading block having a plurality of disks with surfaces that define a plurality of channels, where the plurality of disks of the first extruder screw pass through the plurality of channels of the second screw as the first extruder screw and the second extruder screw rotate relative each other, each of the plurality of disks has a width (e) between opposite substantially parallel major surfaces of each disk that is 2.0% to 8.5% of a nominal inner diameter of an extruder barrel in which the extruder screw system operates, and each of the plurality of channels has a width between disks that is 3.0% to 9.5% of the nominal inner diameter of the extruder barrel.

Embodiment 17: any one of the embodiments, wherein the predetermined pressure of the molten blend in the melt seal is about 800 pounds or more per square inch.

Embodiment 18: any one of the embodiments, wherein the one or more stabilizing agents comprises one or more non-polymeric stabilizing agents or one or more polymeric stabilizing agents selected from the group consisting of one or more polar polymeric stabilizing agents, one or more non-polar polymeric stabilizing agents, and combinations thereof.

Embodiment 19: any one of the embodiments, wherein the one or more base polymers comprise one or more thermoplastic polymers.

Embodiment 20: any one of the embodiments, wherein injecting water and optionally the neutralizing agent into the molten blend in the high internal phase emulsion zone includes injecting a mass of water equal to 3 to 50 weight percent, based on the weight of the one or more base polymers.

Embodiment 21: the embodiment 20, wherein injecting the mass of water includes providing the mass of water at one injection point into the high internal phase emulsion zone.

Embodiment 22: any one of the embodiments, wherein the process further comprises maintaining the temperature of the molten blend and the high internal emulsion at a temperature greater than the melting point temperature of the one or more base polymers.

Embodiment 23: any one of the embodiments, wherein the aqueous dispersion has an average particle size diameter of less than 5 microns.

Embodiment 24: any one of the embodiments, wherein diluting the high internal emulsion with water in the dilution zone to form the aqueous dispersion includes adding water to reduce a packing fraction of particles of the one or more base polymers below a value of 0.74.

Embodiment 25: any one of the embodiments, wherein the aqueous dispersion comprises less than 90 percent by weight of water.

Embodiment 26: any one of the embodiments, the aqueous dispersion comprises less than 85 percent by weight of solid contents, based on the total weight of the aqueous dispersion. Other ranges include, but are not limited to, 35 to 75 percent by weight of solid content and 40 to 65 percent by weight of solid content.

Embodiment 27: any one of the embodiments, wherein diluting the high internal emulsion with water in the dilution zone to form the aqueous dispersion includes injecting a first dilution water to reduce a packing fraction of particles of the one or more base polymers below a value of 0.74; and injecting a second dilution water having a temperature below the melting point temperature of the one or more base polymers.

Embodiment 28: any one of the embodiments, including cooling the aqueous dispersion to a temperature of 110° C. or less in the dilution zone.

Embodiment 29: any one of the embodiments, including maintaining the aqueous dispersion at a second predetermined pressure in the dilution zone.

Embodiment 30: in embodiment 29, wherein the second predetermined pressure of the aqueous dispersion in the dilution zone is about 600 to about 700 pounds per square inch.

Embodiment 31: any one of the embodiments, wherein the one or more base polymers are one or more polyolefins.

Embodiment 32: an aqueous dispersion of one or more base polymers and water obtainable by a process according to the embodiments as described herein.

DETAILED DESCRIPTION

Embodiments of the present disclosure include an extruder screw system, an extruder system having the extruder screw system, a continuous process for the production of an aqueous dispersion of one or more base polymers and water using the extruder system having the extruder screw system, and the aqueous dispersion of the one or more base polymers and water produced with the continuous process. In one embodiment, the aqueous dispersions formed by the embodiments of the present disclosure do not include an organic solvent, but rather are water-based aqueous dispersions.

Embodiments of the present disclosure may also bring the functionality of such base polymers as polyolefins, as discussed herein, to applications that have been served by emulsion polymer latexes. Such functionalities include, but are not limited to, moisture resistance, chemical resistance, sealability, adhesion, low temperature flexibility, among others.

The aqueous dispersions of the present disclosure may be suitable for a variety of applications. Such applications include, but are not limited to, architectural coating applications, automotive coating applications, paper coating applications, seed coating applications, conductive coatings and industrial coating applications, adhesives applications, sealant applications, foam applications, toner applications, and controlled released coating applications. For the various embodiments, the aqueous dispersions of the present disclosure may be applied in a variety of ways. Such ways include, but are not limited to, frothed foaming, roll coating, spray coating, spray drying, impregnation (e.g., fabric impregnation), among others.

The term "dispersion" as used herein refers to finely divided particles in a continuous liquid medium. For the embodiments of the present disclosure, the continuous liquid medium includes water, where for various embodiments the continuous liquid medium is water.

Figure 1:
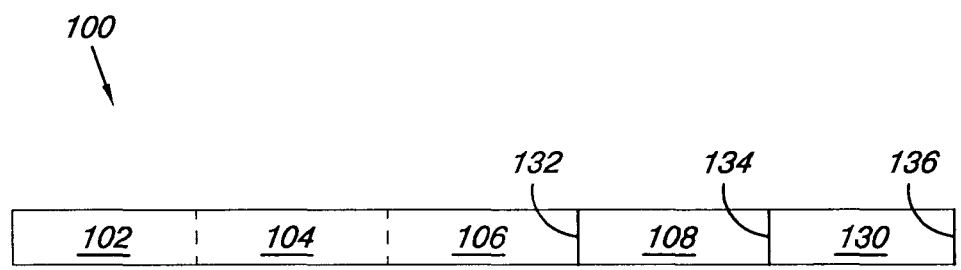
FIG. 1 is a block diagram of an embodiment of an extruder screw according to the present disclosure.

Referring to FIG. 1, there is shown one embodiment of an extruder screw 100 according to the present disclosure. For the various embodiments, the extruder screw 100 includes a number of segments along its length. The segments may or may not be separable physically from each other.

For the various embodiments, each of the various segments along the extruder screw 100 can have exterior surfaces defining structures that serve different purposes. For example, the extruder screw 100 includes feed segment 102 and a conveying segment 104. Each of the feed segment 102 and the conveying segment 104, as well as other segments of the extruder screw 100, can include one or more raised ridges helically disposed thereabout. Each of the ridges can be referred to as a flight. A flight may have a forward pitch or a reverse pitch. The degree of the pitch may be varied. For one or more of the embodiments, the degree of pitch can be 9 degrees to 32 degrees. More preferably, the degree of pitch can be from 12 degrees to 23 degrees. One specific value for a preferred degree of pitch is 17.6 degrees.

For the various embodiments, the feed segment 102 and/or the conveying segment 104 may contain the same or a different number of flights, may contain a flight discontinuity, or may at certain portions along the length contain no flights at all.

A surface of the screw 100 above which the structures (e.g., the flight(s)) are raised can be referred to as the root of the screw. When the screw 100 is viewed in cross section (i.e. in a plane perpendicular to its longitudinal axis), the course of a particular flight, between one point of intersection with a line parallel to the screw axis and the next closest point of intersection of the flight with such line, defines a 360 degree circle. A pointed or rounded tip which extends toward the perimeter of the circular cross section can define a lobe above the root of the screw. A distance in the longitudinal (axial) direction along the screw 100, between one point on a line intersecting a particular flight and the next closest point of intersection of such line with the same flight, is one turn of the screw. A space bounded by the root of the screw and side walls of any two flights can be referred to as a channel of the screw. The side wall of a flight may, if desired, be undercut. The screw can rotate on its longitudinal axis within a barrel or sleeve of the extruder system, as discussed herein, which may be described as the bore of an annular cylinder.

The extruder screw 100 further includes a mixing and melting segment 106. For the various embodiments, the mixing and melting segment 106 can include a combination of different exterior surfaces defining structures that provide for kneading, conveying and developing pressure of a melt of one or more base polymers and one or more stabilizing agents according to the present disclosure. For example, the mixing and melting segment 106 can include one or more conventional kneading block elements. For the various embodiments, the conventional kneading block elements can have up to five disks, where the disks can be set at an angle to convey the flow of the melt in either a forward (from left to right along extruder screw 100 in FIG. 1) or a reverse direction (from right to left along extruder screw 100 in FIG. 1). For example, the disks of a conventional kneading block element can be pitched at a predetermined angle, such as 45 degrees, along either the forward or reverse direction along the extruder screw 100. For the various embodiments, the disks of the conventional kneading block elements can also be set in a neutral position, where the disks of the conventional kneading block elements are set 90 degrees relative to each other.

For the various embodiments, the mixing and melting segment 106 can also include one or more flights, as discussed herein, one or more partial flights, and/or portions without a flight. For the various embodiments, flights, partial flights, and/or portions without a flight may be upstream of, downstream of and/or positioned between one or more kneading blocks in the mixing and melting segment 106.

The extruder screw 100 further includes a high internal phase emulsion (HIPE) segment 108. For the various embodiments, the RIPE segment 108 includes one or more of a mixing element, such as a turbine mixing element and one or more of a kneading block of the present disclosure. For the various embodiments, the one or more of the mixing elements can be upstream (i.e., precede) the one or more of a kneading block of the present disclosure.

Figure 3A:
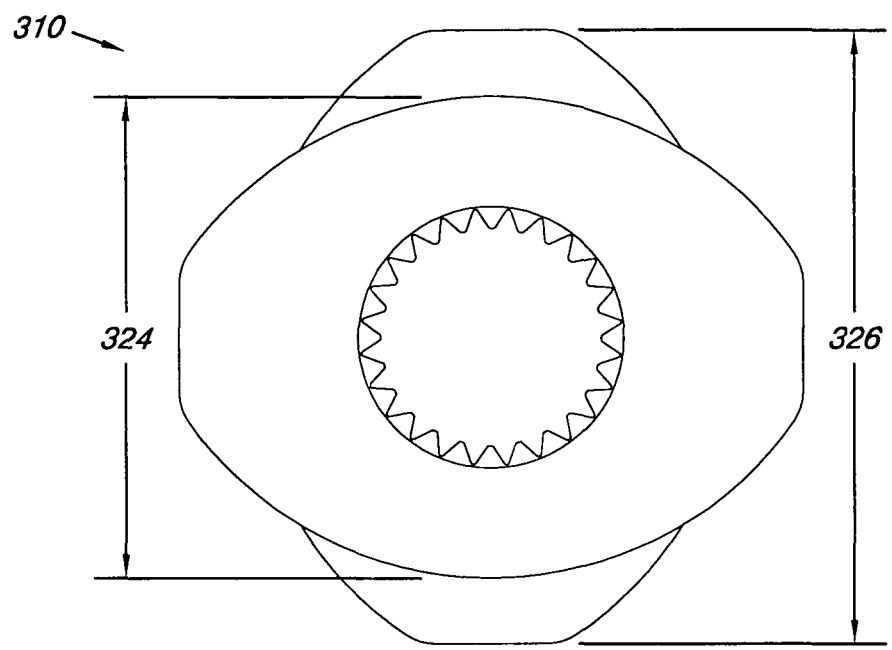
FIGS. 3A through 3C are schematic illustrations of an embodiment of a kneading block according to one embodiment of the present disclosure.
Figure 3B:
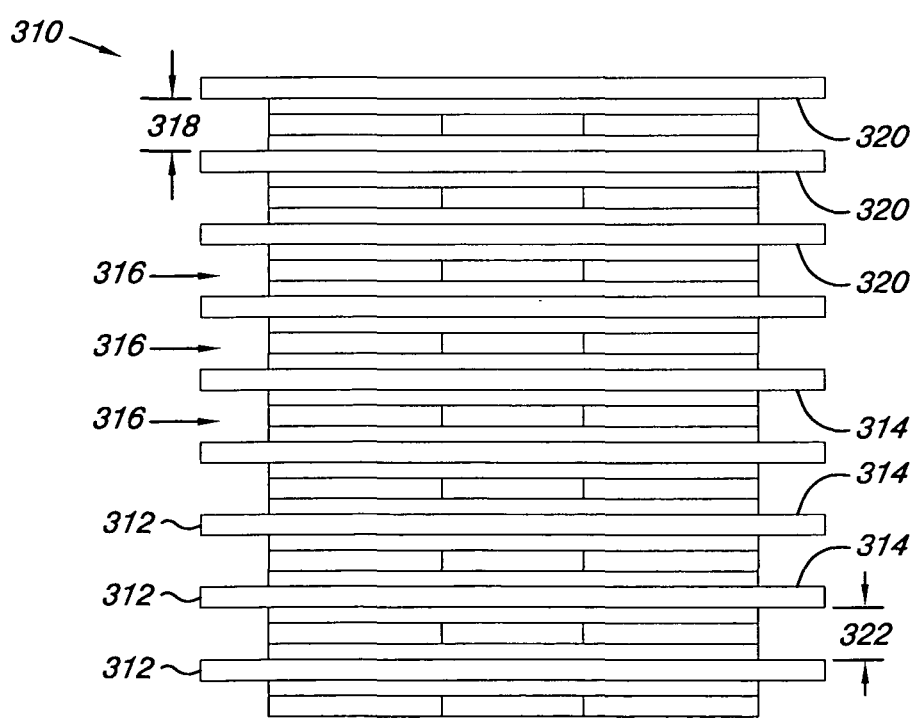
Figure 3C:
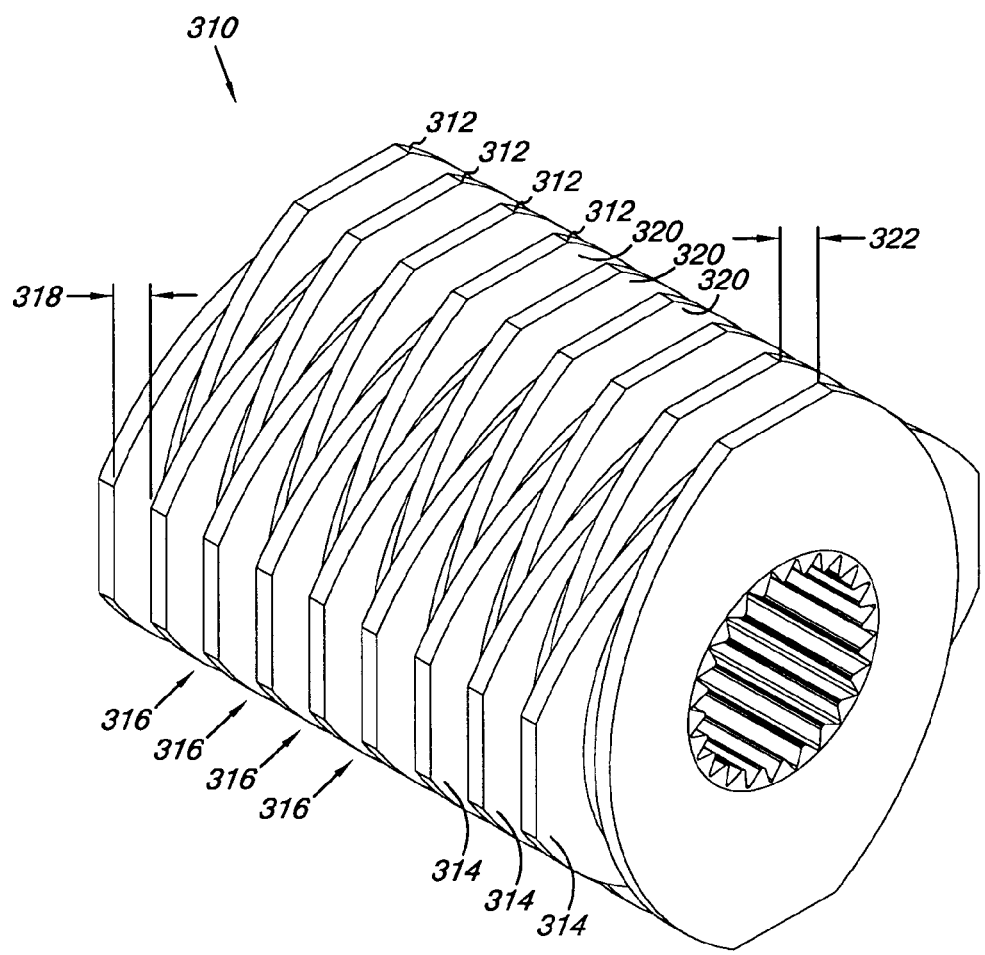

FIG. 3A through 3C illustrates an embodiment of kneading block 310 according to the present disclosure. As illustrated, the kneading block 310 includes a plurality of disks 312 with surfaces 314 that define a plurality of channels 316. For one or more of the embodiments, each of the plurality of disks 312 is a neutral disk having substantially parallel major surfaces 320 that are perpendicular from the radial surface from which the root diameter is taken. For or more of the embodiments, each of the plurality of disks 312 has substantially parallel major surfaces 320 that are at an angle with respect to the radial surface from which the root diameter is taken. The angle may be positive or negative and have a value that is between 0 degrees and 90 degrees.

For the various embodiments, each of the plurality of disks 312 has a width (e) 318 between opposite substantially parallel major surfaces 320 of each disk 312. Each of the plurality of channels also has a width 322 between disks 312. For the various embodiments, the width (e) 318 of each disk 312 can be 3 millimeters or less. More preferably, the width (e) 318 of each disk 312 can be 2.5 millimeters or less. For the various embodiments, the width 322 of each channel is greater than 3 millimeters so as to allow the plurality of disks 312 of a first of the extruder screw 100 to pass through the plurality of channels 316 of a second of the extruder screw 100 as the first of the extruder screw 100 and the second of the extruder screw 100 rotate relative each other in an extruder screw system to form a high internal emulsion, as will be discussed herein.

For the various embodiments, the width 322 of each of the plurality of channels 316 can preferably be 105% to 400% of the width (e) 318 between opposite substantially parallel major surfaces 320 of each disk 312. More preferably, the width 322 of each of the plurality of channels 316 can be 110% to 200% of the width (e) 318 between opposite substantially parallel major surfaces 320 of each disk 312. Even more preferably, the width 322 of each of the plurality of channels 316 can be 112% to 175% of the width (e) 318 between opposite substantially parallel major surfaces 320 of each disk 312. One specific preferred value for the width 322 of each of the plurality of channels 316 can be 132% of the width (e) 318 between opposite substantially parallel major surfaces 320 of each disk 312. For example, one configuration for a 58 millimeter extruder barrel (60 millimeter nominal diameter extruder barrel) that can achieve this specific value is when the width 322 of each of the channels 316 is 3.3 millimeters and the width (e) 318 between opposite substantially parallel major surfaces 320 of each disk 312 is 2.5 millimeters. Other values for the width 322 and the width (e) 318 are also possible.

In an additional embodiment, the dimension of the width (e) 318 can be related to a nominal inner diameter of an extruder barrel in which the extruder screw system, as discussed herein, operates. For the various embodiments, the dimension of the width (e) 318 can preferably be 2.0% to 8.5% of the nominal inner diameter of the extruder barrel in which the extruder screw system operates. More preferably, the dimension of the width (e) 318 can be 2.5% to 8.0% of the nominal inner diameter of the extruder barrel in which the extruder screw system operates. Even more preferably, the dimension of the width (e) 318 can be 3.0% to 7.5% of the nominal inner diameter of the extruder barrel in which the extruder screw system operates. One specific preferred value for the dimension of the width (e) 318 is 4.3% of the nominal inner diameter of the extruder barrel in which the extruder screw system operates.

For the various embodiments, each of the plurality of channels 316 also has a relationship to the nominal inner diameter of the extruder barrel in which the extruder screw system operates. For the various embodiments, each of the plurality of channels has a width 322 between disks 312 that is 3.0% to 9.5% of the nominal inner diameter of the extruder barrel. More preferably, the width 322 is 3.5 to 8.5% of the nominal inner diameter of the extruder barrel. Even more preferably, the width 322 is 4.0% to 8.0% of the nominal inner diameter of the extruder barrel. One specific preferred value for the dimension of the width 322 is 6.0% of the nominal inner diameter of the extruder barrel in which the extruder screw system operates.

For the various embodiments, the kneading block 310 according to the present disclosure can have a root diameter 324, as illustrated in FIG. 3A. Each of the plurality of disks 312 can have an outside diameter taken along 326 in FIG. 3A that is 110% to 190% of the root diameter 324 of the kneading block 310. More preferably, each of the plurality of disks 312 can have an outside diameter taken along 326 in FIG. 3A that is 120% to 180% of the root diameter 324 of the kneading block 310. Even more preferably, each of the plurality of disks 312 can have an outside diameter taken along 326 in FIG. 3A that is 140% to 160% of the root diameter 324 of the kneading block 310. Still more preferably, each of the plurality of disks 312 can have an outside diameter taken along 326 in FIG. 3A that is 146% to 155% of the root diameter 324 of the kneading block 310.

FIGS. 3B and 3C show an embodiment of the kneading block 310 having at least twenty-three disks 312. For the various embodiments, the kneading block 310 can have the at least twenty-three disks 312 for every 80 millimeter length of the kneading block 310. In additional embodiments, there are at least nine disks 312 for every 30 millimeter length of the kneading block 310. In other embodiments, there are at least seventeen disks 312 for every 60 millimeter length of the kneading block 310. Other numbers of disks 312 for a given length of the kneading block 310 are also possible.

Referring again to FIG. 1, the extruder screw 100 also includes a distributing and pumping segment 130. For the various embodiments, the distributing and pumping segment 130 can include one or more flights, mixing elements such as TME (turbine mixing element) and/or ZME (teeth mixing element), and/or conventional kneading blocks, as provided herein and as are known.

For the various embodiments, the extruder screw 100 further includes a first seal segment 132 between the mixing and melting segment 106 and the HIPE segment 108; a second seal segment 134 between the RIPE segment 108 and the distributing and pumping segment 130; and a third seal segment 136 at an end of the extruder screw 100 distal the distributing and pumping segment 130 relative the HIPE segment 108. For the various embodiments, the first seal segment 132, the second seal segment 134 and the third seal segment 136 can each include one or more of a restriction ring. For the various embodiments, the restriction ring can be an annular structure that uniformly extends at a predetermined height above the root diameter of the mixing and melting segment 106, the HIPE segment 108, and/or the distributing and pumping segment 130.

For the various embodiments, the restriction ring can have a beveled shoulder that can be positioned relative the beveled shoulder on another restriction ring on a second of the extruder screw 100 to form a dam in an extruder system using at least two of the extruder screw 100, as discussed herein. The restriction ring can help to form an annular gap between the restriction ring and the extruder barrel, as will be discussed herein. The first seal segment 132, the second seal segment 134 and the third seal segment 136 help to define the longitudinal boundaries the mixing and melting segment 106, the HIPE segment 108, and/or the distributing and pumping segment 130.

For the various embodiments, the various segments of the extruder screw 100 can be formed of a metal or a metal alloy. Examples of suitable metals and/or metal alloys include, but are not limited to, low alloy steels and INCONEL® alloys available from Special Metals Corporation.

For the various embodiments, two or more of the extruder screw 100 can be used in an extruder screw system. For example, the extruder screw system can include a first extruder screw and a second extruder screw, where each of the first extruder screw and the second extruder screw are as described herein for the extruder screw 100. For the various embodiments, the two or more of the extruder screw 100 are designed to allow the various structures for kneading, conveying, mixing, forming a dam, and/or developing pressure within an extruder system to pass and rotate relative to each other. For example, as discussed herein the plurality of disks (e.g., disks 312 as seen in FIG. 3C) of the first extruder screw can pass through the plurality of channels (e.g., channels 316 as seen in FIG. 3C) of the second screw as the first extruder screw and the second extruder screw of the extruder screw system rotate relative each other.

For the various embodiments, the segments of the two or more extruder screws of an extruder screw system can correspond to distinct zones along a length of an extruder system. For the various embodiments, a zone is portion of the extruder system where one or more processing steps can occur. Examples of processing steps include, but are not limited to, feeding, conveying, mixing, melting, sealing, emulsifying, diluting, and cooling, among others.

Figure 2:
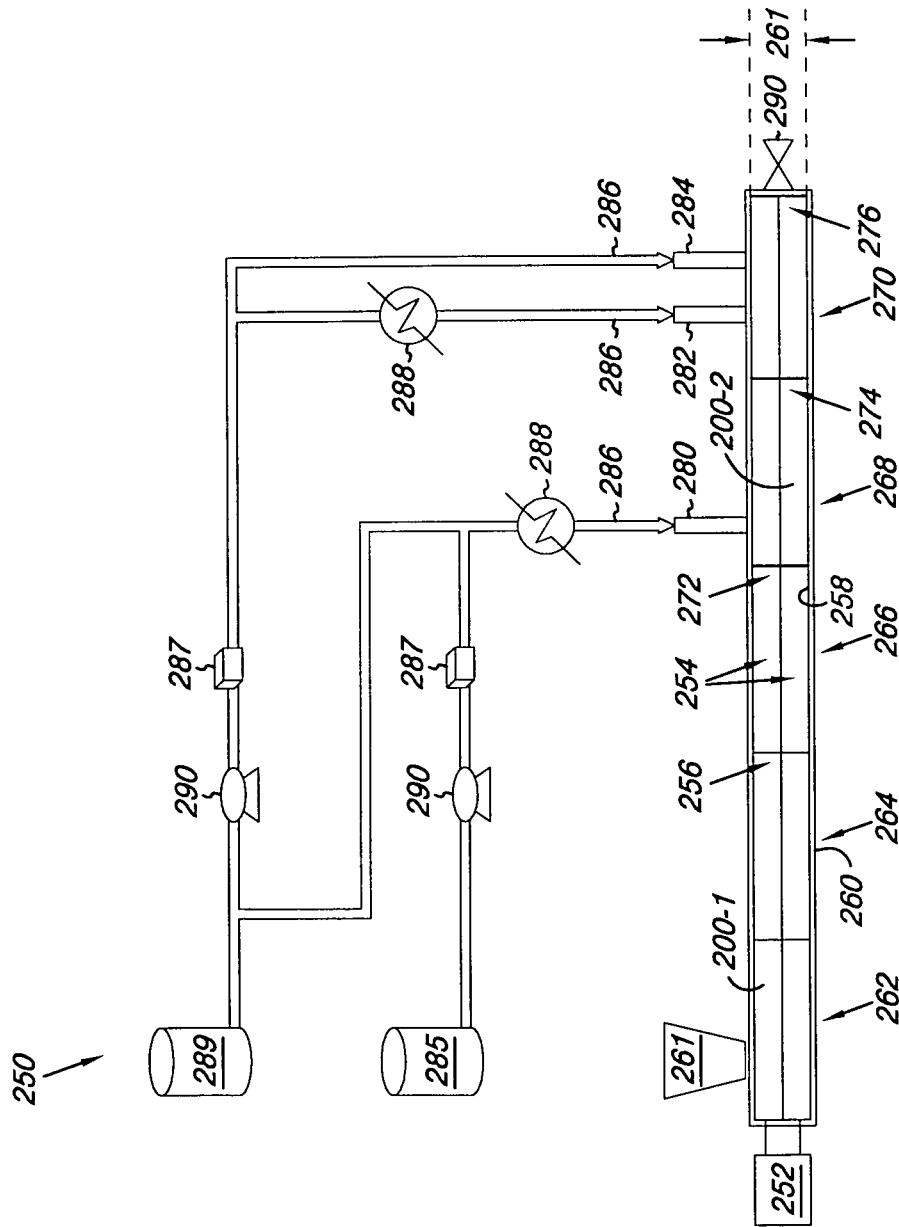
FIG. 2 is a block diagram of an embodiment of an extruder system having at least a first extruder screw and a second extruder screw according to the present disclosure.

Referring to FIG. 2, there is illustrated an embodiment of an extruder system 250 of the present disclosure. For the various embodiments, the extruder system 250 includes a drive mechanism 252 that is coupled to the extruder screw system 254. As discussed herein, the extruder screw system 254 can include two or more extruder screws as described herein for the extruder screw 100 and are illustrated in FIG. 2 as 200-1 and 200-2 respectively.

For example, the extruder screw system 254 can include at least one of a first extruder screw 200-1 and at least one of a second extruder screw 200-2. For the various embodiments, the first extruder screw 200-1 and the second extruder screw 200-2 are coupled to the drive mechanism 252 that rotates the screws. The drive mechanism 252 can rotate the first extruder screw 200-1 and the second extruder screw 200-2 in either a co-rotating (in either clockwise or counter-clockwise direction) or a counter-rotating direction (the screws rotating in different directions, i.e. one clockwise and one counter-clockwise). As appreciated, if more than two extruder screws according to the present disclosure are used they can also be rotated by the drive mechanism 252 in a counter-rotating direction, a co-rotating direction or a combination of both.

For one or more embodiments, the extruder screw system 254 can be intermeshing. The extruder screw system 254 can be considered intermeshing when a flight of the first extruder screw 200-1 is at least partially disposed within a channel of the second extruder screw 200-2. In such configuration, the distance between the axis of each screw is less than the sum of the respective radii of the two screws, when each radius is measured from the axis to the top of the tallest or highest flight of the screw. When a flight has a shape and size such that its fit into a channel in which it is intermeshed is close enough that substantially no material passes between the flight and channel, the screws can be referred to as conjugated. For one or more embodiments, the extruder screw system 254 can be conjugated. Otherwise, the screws are said to be non-conjugated, and the degree of intermeshing in the case of non-conjugation can be varied from a position immediately before conjugation to a point wherein 5 percent, from the axis to the top of the tallest or highest flight of the extruder screw 200-1, is disposed within a channel of the second extruder screw 200-2.

For one or more embodiments, the extruder screw system 254 can be wiping. When two counter-rotating screws are conjugated, there is little or no opportunity for material which is being extruded to remain in the channel of either screw in the region in which the screws intermesh. This is a result of the minimal clearance of the flight of one intermeshing screw within the channel of the other screw. Screws which are arrayed in such manner can be referred to as wiping because the material which is carried in the channel of either screw will be prevented from remaining in that channel over a distance of more than one turn of the screw by the obstacle which the intermeshing flight represents. For one or more embodiments, the extruder screw system 254 is not wiping.

For the various embodiments, the first extruder screw and the second extruder screw reside at least partially within a volume 256 defined by an interior wall 258 of the extruder barrel 260. For the various embodiments, the inner wall 258 of the extruder barrel 260 can provide for a nominal inner diameter 261 of the extruder barrel 260 through which each respective extruder screw of the extruder screw system 254 travels.

For the various embodiments, the segments of the extruder screw system residing at least partially within the volume 256 of the barrel 260 correspond to distinct zones along a length of the extruder system 250. For example, the feed segment (element 102 in FIG. 1) and the conveying segment (element 104 in FIG. 1) when positioned inside the extruder barrel 260 provide a feed zone 262 and a conveying zone 264, respectively, for the extruder system 250. For the various embodiments, the mixing and melting segment (element 106 in FIG. 1) inside the extruder barrel 260 provide the extruder system 250 with a mixing and melting zone 266 for the extruder system 250. For the various embodiments, the extruder barrel 260 can include one or more heating elements in the mixing and melting zone 266, among other locations along the extruder barrel 260 as desired, to supply energy to heat the extruder barrel 260 and the contents of the barrel 260 in the mixing and melting zone 266.

For the various embodiments, the HIPE segment (element 108 in FIG. 1) for each of the extruder screws of the extruder screw system 254 include the kneading block as discussed with reference to FIG. 3A through 3C. As provided herein, the HIPE segment of the extruder screw system 254 provides for a high internal phase emulsion (HIPE) zone 268 for the extruder system 250. For the various embodiments, the distributing and pumping segment (element 130 in FIG. 1) inside the extruder barrel 260 provide the extruder system 250 with a dilution zone 270 for the extruder system 250.

For the various embodiments, the first seal segment, the second seal segment and the third seal segment (elements 132, 134, and 136 in FIG. 1) of each extruder screw of the extruder screw system 254 help to define the various zones discussed herein for the extruder system 250. For example, the first seal segment of each extruder screw of the extruder screw system 254 can be located between the mixing and melting zone 266 and the HIPE zone 268. In conjunction with the extruder barrel 260 the first seal segment forms a first seal zone 272 for the extruder system 250. In addition, the second seal segment of each extruder screw of the extruder screw system 254 can be located between the HIPE zone 268 and the dilution zone 270. In conjunction with the extruder barrel 260 the second seal segment forms a second seal zone 274 for the extruder system 250. The extruder system 250 also includes the third seal segment located at an end distal the dilution zone 270, relative the HIPE zone 268. In conjunction with the extruder barrel 260 the third seal segment forms a third seal zone 276 for the extruder system 250.

As discussed herein, the seal segments of the extruder screw system 254 act in conjunction with the interior wall 258 of the extruder barrel 260 to provide a dam. For the various embodiments, the dam formed by seal segments and the interior wall 258 can have an annular gap between the interior wall 258 and an outer diameter surface of the seal segment. For the various embodiments, the gap can have a predetermined width that allows for sufficient pressures to be generated and maintained under stability in the various zones that the seals help to define. For the various embodiments, examples of such predetermined widths include, but are not limited to, 1.0 to 3.0 millimeter. Preferably, the predetermined widths can be 1.5 mm to 2.0 mm. Other predetermined widths are possible, the determination of which will be dependent upon the requirements of the particular extruder system in which they are to operate.

It is also appreciated that more than one seal segment can be used on each of the extruder screws in forming the dam in the extruder system 250. So, for example, two seal segments can be positioned directly adjacent each other along each of the extruder screws, where these adjacently positioned seal segments interact within the extruder system 250 to provide the dam function discussed herein.

For the various embodiments, the extruder system 250 further includes a first inlet 280 and a second inlet 282, where each inlet 280 and 282 passes through the interior wall 258 into the volume 256 of the extruder barrel 260. For the various embodiments, the second inlet 282 can be divided into an auxiliary inlet 284. The first inlet 280 and the second inlet 282 can each be coupled to their respective feed conduit 286. The respective feed conduit 286 can be used to deliver fluids under a desired pressure and temperature to the respective zones where the inlets are located. One or more flow meters 287 can be included on a respective feed conduit 286. For the various embodiments, a heat exchanger 288 can be used to add, or remove, heat from the fluid flowing in the respective feed conduit 286, and pump 290 can be used to add pressure to the fluid.

As illustrated in FIG. 2, the first inlet 280 passes into the HIPE zone 268 and the second inlet 282 passes into the dilution zone 270. For the various embodiments, the first and second inlets 280 and 282 can be used to inject, among other things, water into the volume 256 of the extruder barrel 260. The water can be from a variety of sources including water containing vessel 289. The injected water can be used to form a high internal emulsion in the HIPE zone 268 of water and one or more base polymers, as discussed herein. In addition, the inject water can also be used to dilute the high internal emulsion in the dilution zone 270 to form the aqueous dispersion of the present disclosure.

More specifically, the embodiments of the present disclosure include a continuous process for the production of an aqueous dispersion of at least one or more base polymers in water. For the various embodiments, one or more base polymers and one or more stabilizing agents are introduced into the feed zone 262 of the extruder system 250 via extruder system input 261. The one or more base polymers and one or more stabilizing agents are conveyed through the feed zone 262 and the conveying zone 264, where they can be heated, to the mixing and melting zone 266 of the extruder system 250. Here the one or more base polymers and one or more stabilizing agents are formed into a melt through the heat absorbed from both the mechanical action of the extruder screw system 254 and heat supplied through the extruder barrel 260.

In the mixing and melting zone 266 of the extruder system 250 the one or more base polymers and the one or more stabilizing agents are formed into a molten blend through the mixing action of the extruder screw system 254. The segments of each of the extruder screws in the extruder screw system 254 also transfer force to the molten blend in the mixing and melting zone to form a melt seal against the first seal zone 272. For the various embodiments, the molten blend in the melt seal exerts a predetermined pressure against first seal zone as the extruder screw system 254 rotates. For the various embodiments, the predetermined pressure of the molten blend in the melt seal can provide essentially the entire amount of pressure required to convey the contents of the extruder system 250 through the remainder of the zones. By way of example, one suitable pressure value for the predetermined pressure of the molten blend in the melt seal can be about 800 pounds per square inch. However, as each screw system may be different and different base polymers may be used, values for the predetermined pressure may be different and will have to be determined for each case.

For the various embodiments, the molten blend then passes under the predetermined pressure through the first seal zone 272 into the HIPE zone 268. In the HIPE zone, water and optionally one or more neutralizing agent are injected through the first inlet 280 under pressure. The optional neutralizing agent can be sourced from neutralizing agent containing vessel 285. In one embodiment, the water and the optional neutralizing agent are injected at a temperature that is above the melting point temperature of the one or more base polymers of the molten blend. In addition, the water injected into the molten blend in the HIPE zone 268 can have a mass that is equal to 3 to 50 weight percent of a mass of the one or more base polymers in the molten blend. As illustrated, this mass of water is provided at the one injection point into the HIPE zone 268. It is appreciated, however, that this one injection point can take the form of two or more inputs spaced around the perimeter of the HIPE zone 268 if desired.

For the various embodiments, the first inlet 280 can be located at an upstream portion of the HIPE zone 268. In an additional embodiment, the HIPE segment of the extruder screw system 254 can have mixing elements, such as a TME, directly adjacent the first inlet 280. For the various embodiments, the water and the optional neutralizing agent are injected into the molten blend in the HIPE zone 268, where the predetermined pressure generated by the melt seal in the mixing and melting zone 266 maintains the water in a liquid state.

For the various embodiments, the HIPE segment 108 of each of the extruder screws 100 interact with each other in the HIPE zone 268 to emulsify the molten blend (the one or more base polymer and the one or more stabilizing agents), the water and the optional neutralizing agent so as to form a high internal emulsion. In one embodiment, the temperature of the molten blend and the high internal emulsion in the HIPE zone 268 can be maintained so as to be greater than the melting point temperature of the one or more base polymers. As such, the temperature of the molten blend and the high internal emulsion can be maintained at a temperature greater than the melting point temperature of the one or more base polymers.

For the various embodiments, the actions of the kneading blocks in the HIPE zone 268 form particles of the one or more base polymers of the molten blend, which are suspended in the water to form the high internal emulsion. For the various embodiments, forming particles of the one or more base polymers formed in the HIPE zone 268 can be accomplished as the plurality of disks of the kneading block for the first extruder screw pass through the plurality of channels on the kneading block of the second screw as the drive mechanism 252 rotates the first extruder screw and the second extruder screw relative each other. For the various embodiments, one or more of the disks of the kneading blocks can be self-wiping. For the various embodiments, the one or more of the disks of the kneading blocks while still intermeshing need not be self-wiping. In addition, in various embodiments one or more of the disks can be fully and/or partially intermeshing.

For the various embodiments, the high internal emulsion from the HIPE zone 268 is then passed through the second seal zone 274 into the dilution zone 270. In the HIPE zone 268, particles of the one or more base polymers are tightly packed relative to each other. For the various embodiments, these particles in the HIPE zone 268 are believed to be at or above a packing fraction of 0.74. For the various embodiments, a packing fraction is the fraction of volume that is occupied by the particles, the value of which is dimensionless and is less than unity (1.0). As the particles emerge from the HIPE zone water is injected through the second inlet 282 to dilute the high internal emulsion. Diluting the high internal emulsion with water in the dilution zone forms the aqueous dispersion of the particles and water. In one embodiment, the water injected at the second inlet 282 can be at or above the melting point temperature of the one or more base polymers.

As the water is injected through the second inlet 282, the packing fraction of the particles of the high internal emulsion begins to decrease as the aqueous dispersion is formed. For the various embodiments, enough water is added through the second inlet 282 to reduce the packing fraction of the particle of the one or more base polymers to a value below 0.74.

For the various embodiments, water can be added to form the aqueous dispersion in amounts of 20 to 400 parts by weight of water for each 100 parts by weight of the high internal emulsion. Preferably, water can be added to form the aqueous dispersion in amounts of 30 to 200 parts by weight of water for each 100 parts by weight of the high internal emulsion. More preferably, water can be added to form the aqueous dispersion in amounts of 60 to 140 parts by weight of water for each 100 parts by weight of the high internal emulsion.

In an additional embodiment, diluting the high internal emulsion with water in the dilution zone to form the aqueous dispersion can also include adding water to form the aqueous dispersion that has less than 90 percent by weight of water. In one embodiment, the aqueous dispersion comprises less than 85 percent by weight of solid contents, based on the total weight of the aqueous dispersion. In another embodiment, the aqueous dispersion comprises 35 to 75 percent by weight of solid contents, based on the total weight of the aqueous dispersion. In another preferred embodiment, the aqueous dispersion comprises 40 to 65 percent by weight of solid contents, based on the total weight of the aqueous dispersion. Preferably, diluting the high internal emulsion with water in the dilution zone to form the aqueous dispersion can be by adding enough water to form the aqueous dispersion having a solids content of 35 percent by weight to 65 percent by weight of solid contents, based on the total weight of the aqueous dispersion. In an additional preferred embodiment, diluting the high internal emulsion with water in the dilution zone to form the aqueous dispersion can include adding enough water to form the aqueous dispersion having a solids content of 40 to 65 percent by weight of solid contents, based on the total weight of the aqueous dispersion.

For the various embodiments, it is also possible to separate the water used to form the aqueous dispersion from the high internal emulsion into two or more streams that are injected into the dilution zone 270. For the various embodiments, the use of two or more streams of water allows for the viscosity of the aqueous dispersion to be adjusted along the length of the dilution zone 270 so as to provide beneficial mixing and conveying through the dilution zone 270. For example, a first dilution water can be injected through the second inlet 282 to reduce the packing fraction of particles of the one or more base polymers below 0.74. As discussed herein, this first dilution water can have a temperature value that is equal to at least the melting point temperature of the one or more base polymers. A second dilution water can also be injected at auxiliary inlet 284. For the various embodiments, the second dilution water injected in the dilution zone 270 can have a temperature value that is below the melting point temperature of the one or more base polymers. This allows for some cooling of the aqueous dispersion in the dilution zone 270.

For the various embodiments, the extruder barrel 260 can be used to cool the aqueous dispersion in the dilution zone 270. For example, the extruder barrel 260 can be equipped with a cooling jacket that can be used to remove heat energy from the aqueous dispersion. In one embodiment, water can be used as a cooling fluid in the cooling jacket of the extruder barrel 260. Other cooling devices for use with the extruder barrel 260 are also possible.

In one embodiment, the amount of cooling of the aqueous dispersion in the dilution zone 270 does not necessarily produce a temperature value for the aqueous dispersion that is less than the melting point temperature of the one or more base polymers of the particles. In one embodiment, the aqueous dispersion can be cooled to a temperature of 110° C. or less, where this temperature can be achieved by at least the exit of the dilution zone 270. Other temperature values for the aqueous dispersion achieved by at least the exit of the dilution zone 270 can include 100° C. to 90° C.

For the various embodiments, the aqueous dispersion in the dilution zone 270 is held under a second predetermined pressure. As discussed herein, the melt seal in the mixing and melting zone 266 exerts a predetermined pressure against first seal zone 272 as the extruder screw system 254 rotates. For the various embodiments, this predetermined pressure can then provide for the second predetermined pressure of the aqueous dispersion that is achieved and maintained in the dilution zone 270. For the various embodiments, the second seal zone 274 and the third seal zone 276 help to maintain the pressure of the aqueous dispersion in the dilution zone 270. For the various embodiments, the use of the seal zones 272, 274 and 276 help to stabilize pressures and/or flow through the extruder system 250 so that the aqueous dispersion of the present disclosure can be formed.

For the various embodiments, the second predetermined pressure of the aqueous dispersion in the dilution zone can have a value in the range of 500 to 800 pounds per square inch, for example from about 600 to about 700 pounds per square inch. For the various embodiments, this second predetermined pressure helps to not only stabilize the system so that the dilution can be formed, but also keeps the water in a liquid state until further cooling can take place. The aqueous dispersion can exit the extruder system 250 under pressure via outlet 290. The aqueous dispersion can then be cooled more fully using one or more heat exchangers.

For the various embodiments, the one or more base polymers may, for example, comprise one or more thermoplastic polymers, one or more olefin based polymers (i.e., polyolefins), one or more acrylic based polymers, one or more polyester based polymers, one or more solid epoxy polymers, one or more thermoplastic polyurethane polymers, one or more styrenic based polymers, or combinations thereof.

Examples of thermoplastic polymers include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening Metathesis and cross metathesis polymerization and the like. These resins may be used either alone or in combinations of two or more.

Exemplary (meth)acrylates, as base polymers, include, but are not limited to, methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, the one or more base polymers may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA). An additional example of a suitable polymer for the one or more base polymers includes polyolefins sold under the tradename AFFINITY™ (an ethylene octene (EO) copolymer available from The Dow Chemical Company).

In other particular embodiments, the one or more base polymers may, for example, be ethylene vinyl acetate (EVA) based polymers. In other embodiments, the one or more base polymers may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the one or more base polymers may, for example, be a semi-crystalline polymer and may have a melting point temperature of less than 110° C. In another embodiment, the melting point temperature may be from 25° C. to 100° C. In another embodiment, the melting point temperature may be between 40° C. and 85° C.

For one or more embodiments, the base polymer can include a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/alpha-olefin copolymers are further described in details in the U.S. Provisional Patent Application No. 60/988,999 and International Paten Application No. PCT/US08/082599, each of which is incorporated herein by reference.

In certain other embodiments, the base polymer, e.g. propylene/alpha-olefin copolymer, may, for example, be a semi-crystalline polymer and may have a melting point temperature of less than 110° C. In preferred embodiments, the melting point temperature may be from 25° C. to 100° C. In more preferred embodiments, the melting point temperature may be between 40° C. and 85° C.

For one or more embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, commercially available under the trademark INFUSE™ from The Dow Chemical Company, may be used as the base polymer. The olefin block copolymer may be an ethylene/α-olefin interpolymer having a $M_w/M_n$ from about 1.7 to about 3.5, at least one melting point temperature, $T_m$, in degrees Celsius, and a density, d, in grams/cubic centimeter, wherein the numerical values of $T_m$ and d corresponding to the relationship: $T_m > -2002.9 + 4538.5(d) - 2422.2(d)^2$.

The olefin block copolymer may be an ethylene/α-olefin interpolymer having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships: $\Delta T > -0.1299(\Delta H) + 62.81$ for ΔH greater than zero and up to 130 J/g, $\Delta T \geq 48°$ C. for ΔH greater than 130 J/g, wherein the CRYSTAF peak being determined using at least 5 percent of the cumulative polymer, and if less than 5 percent of the polymer having an identifiable CRYSTAF peak, then the CRYSTAF temperature being 30° C.

The olefin block copolymer may be an ethylene/α-olefin interpolymer having an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:Re>1481−1629(d).

The olefin block copolymer may be an ethylene/α-olefin interpolymer having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer.

The olefin block copolymer may be an ethylene/α-olefin interpolymer having a storage modulus at 25° C., G' (25° C.), and a storage modulus at 100° C., G' (100° C.), wherein the ratio of G' (25° C.) to G' (100° C.) being in the range of about 1:1 to about 9:1.

The olefin block copolymer may have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3.

The olefin block copolymer may have an average block index greater than zero and up to about 1.0 and a molecular weight distribution, $M_w/M_n$, greater than about 1.3.

In certain embodiments, the base polymer may, for example, comprise a polyester resin. Polyester resin refers to thermoplastic resins that may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), poly(butylene glycol adipate), poly(ethylene glycol adipate), poly(diethylene glycol adipate), poly(hexanediol oxalate), and poly(ethylene glycol sebecate. Other embodiments of the present disclosure use polyester resins containing aliphatic diols such as UNOXOL (a mixture of cis and trans 1,3- and 1,4-cyclohexanedimethanol) available from The Dow Chemical Company (Midland, Mich.).

For the various embodiments, the one or more stabilizing agents can help to promote the formation of an high internal emulsion that is stable. For one or more embodiments, one or more stabilizing can include one or more non-polymeric stabilizing agents or one or more polymeric stabilizing agents selected from the group consisting of one or more polar polymeric stabilizing agents, one or more non-polar polymeric stabilizing agents, and combinations thereof. For the various embodiments, the stabilizing agent can be a polar polymer, having a polar group as either a comonomer or grafted monomer. For example, the one or more stabilizing agents can include one or more polar polyolefins, having a polar group as either a comonomer or grafted monomer. Examples of polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other examples of polymeric stabilizing agents include, but are not limited to, polar polyolefin selected from the group consisting of ethylene ethyl acrylate (EEA) copolymer, ethylene-methacrylic acid copolymer, ethylene methyl methacrylate (EMMA), and ethylene butyl acrylate (EBA) and combinations thereof. Other ethylene-carboxylic acid copolymers may also be employed. Those having ordinary skill in the art will recognize that a number of other useful polymers may also be used.

For one or more embodiments, the one or more stabilizing agents can be selected from the group of long chain fatty acids, fatty acid salts, fatty acid alkyl esters having from 12 to 60 carbon atoms and combinations thereof. In some embodiments, the long chain fatty acid or fatty acid salt may have from 12 to 40 carbon atoms.

Additional examples of the one or more stabilizing agents include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants.

The one or more stabilizing agents can be an external surfactant or an internal surfactant. External surfactants are surfactants that do not become chemically reacted into the base polymer during aqueous dispersion preparation. Examples of external surfactants include, but are not limited to, salts of dodecyl benzene sulfonic acid and lauryl sulfonic acid salt. Internal surfactants are surfactants that do become chemically reacted into the base polymer during aqueous dispersion preparation. An example of an internal surfactant includes 2,2-dimethylol propionic acid and its salts. Various commercially available surfactants may be used in embodiments disclosed herein, including: OP-100 (a sodium stearate), OPK-1000 (a potassium stearate), and OPK-181 (a potassium oleate), each available from RTD Hallstar; UNI-CID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich. For one or more embodiments, a combination of stabilizing agents is employed.

For one or more embodiments, the aqueous dispersion can include 1 to 50 percent by weight of one or more stabilizing agents, based on the total weight of the solid content of the aqueous dispersion. All individual values and subranges from 1 to 45 weight percent are included herein and disclosed herein; for example, the weight percent can be from a lower limit of 1, 3, 5, 10 weight percent to an upper limit of 15, 25, 35, 45, or 50 weight percent. For example, the aqueous dispersion may comprise from 1 to 25, or in the alternative from 1 to 35, or in the alternative from 1 to 40, or in the alternative from 1 to 45 percent by weight of one or more stabilizing agents, based on the total weight of the solid content of the aqueous dispersion. In selected embodiments, the stabilizing agent may be a surfactant, a polymer, or mixtures thereof.

As disclosed herein, a neutralizing agent can optionally be used in the process of forming the aqueous dispersion of the present disclosure. For the various embodiments, the neutralizing agent can partially or fully neutralize the one or more stabilizing agents used in the process. For one or more embodiments, neutralization of the one or more stabilizing agents, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide. Neutralizing agents can be lithium hydroxide or sodium hydroxide, for example. For one or more embodiments, the neutralizing agent may, for example, be a carbonate. For one or more embodiments, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1,2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Embodiments of the aqueous dispersions described herein contain water in addition to the components as described above. Deionized water is typically preferred. In some embodiments, water with excess hardness can undesirably affect the formation of a suitable aqueous dispersion. Particularly water containing high levels of alkaline earth ions, such as $Ca^{2+}$, should be avoided.

The aqueous dispersion comprises from 5 to 99 percent by weight of one or more base polymers, based on the total weight of the solid content of the aqueous dispersion. All individual values and subranges from 5 to 99 weight percent are included herein and disclosed herein; for example, the weight percent can be from a lower limit of 5, 8, 10, 15, 20, 25 weight percent to an upper limit of 40, 50, 60, 70, 80, 90, 95, or 99 weight percent. For example, the aqueous dispersion may comprise from 15 to 99, or from 15 to 90, or 15 to 80, or from 15 to 75, or from 30 to 70, or from 35 to 65 percent by weight of one or more base polymers, based on the total weight of the solid content of the aqueous dispersion. The aqueous dispersion includes at least one or more base polymers.

Some aqueous dispersions described herein comprise particles having an average particle size of less than about 1.5 µm. In other embodiments, the average particle size ranges from about 0.05 µm to about 1.5 µm. In still other embodiments, the average particle size of the aqueous dispersion ranges from about 0.5 µm to about 1.5 µm.

Average particle size diameter may also be measured via light scattering using a particle size analyzer or by electron microscopy using Transmission Electron Microscopy (TEM) or Scanning Electron Microscopy (SEM). In Particle Size Analyzer method, a Beckman Coulter LS230 particle size analyzer may be used with a Small Volume Module as the sample delivery system. The software version utilized is Version 3.29. Hardware and software are available from Beckman Coulter Inc., Miami, Fla. The analysis conditions for all measurements includes a fluid refractive index of 1.332, a sample real refractive index of 1.5, and a sample imaginary refractive index of 0.0. The extended optical model was not employed. The polarization intensity differential scattering (PIDS) option is activated and used to generate the particle size information. The average particle size diameter is measured and reported in µm. Electron Microscopy may be accomplished via any of the following methods:

(1) TEM

The samples are first diluted with distilled water (1 drop latex to 10 mL of D.I. water) then a ~5 µL drop is placed onto a Formvar (polyvinyl formal) coated TEM grid and allowed to air dry. The samples are examined with a JEOL JEM-1230 TEM operating at an accelerating voltage of 120 kV using either the standard specimen holder or using the cryo-stage at −120° C. Digital images are acquired with a Gatan Multiscan 794 CCD camera with a resolution of 1024×1024 pixels and processed with Adobe Photoshop 5.0. Image analysis is done using ImageJ software. A threshold is applied to gray-scale images, agglomerates are separated using a watershed function, and particle areas are measured. Particle areas are converted to equivalent diameters via the equation diameter=2*sqrt(Area/π). Particles with a diameter ranging from ~3 nm to 3 µm can be measured by TEM techniques.

(2) SEM

The samples are diluted with deionized water, and then are dropped onto a fragment of clean silicon wafer and dried at room temperature. After they are sputter coated with 10 nm of osmium they are imaged in an FEI Nova NanoSEM field emission gun scanning electron microscope at 3 to 5 keV. Image analysis is done using ImageJ software. A threshold is applied to gray-scale images, agglomerates are separated using a watershed function, and particle areas are measured. Areas were converted to diameters via the equation diameter=2*sqrt(Area/π). Diameters ~50 nm to 50 µm can be measured.

Another parameter that characterizes particles in the aqueous dispersions is the particle size distribution, defined herein as the volume average particle diameter (Dv) divided by number average particle diameter (Dn). Some embodiments are characterized by a particle size distribution of less than or equal to about 2.0. In other embodiments, the aqueous dispersions have a particle size distribution of less than or equal to about less than 1.9, 1.7, or 1.5.

Preferably, the aqueous dispersions are characterized by a percent solids content of less than about 74% by volume. Some aqueous dispersions have a percent solids of from about 5% to about 74% by volume. Still other aqueous dispersions have a percent solids of less than about 70% by volume, less than about 65% by volume, or from about 5% to about 50% by volume.

For one or more embodiments, the aqueous dispersions include 35 percent to 80 percent by volume of fluid medium, based on the total volume of the aqueous dispersion. The fluid medium can be water. In some embodiments, the water content may be in the range of from 35 to 75, or in the alternative from 35 to 70, or in the alternative from 45 to 60 percent by volume, based on the total volume of the aqueous dispersion. Water content of the aqueous dispersion may be controlled so that the solids content (base polymer plus stabilizing agent) is between about 1 percent to about 74 percent by volume. In some embodiments, the solids range may be between about 10 percent to about 70 percent by volume. In other embodiments, the solids range is between about 20 percent to about 65 percent by volume. In other embodiments, the solids range is between about 25 percent to about 55 percent by volume.

For one or more embodiments, the aqueous dispersions may further include one or more binder compositions such as acrylic latex, vinyl acrylic latex, styrene acrylic latex, vinyl acetate ethylene latex, and combinations thereof; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more co-solvents, e.g. glycols, glycol ether, 2,2,4-trimethyl-1,3-pentanediol monoisobutyrate, alcohols, mineral spirits, and benzoate esters; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydroobically modified ethoxylated urethane thickeners (HEUR); or optionally one or more additional neutralizing agents, e.g. hydroxides, amines, ammonia, and carbonates.

For the various embodiments, the aqueous dispersion of the present disclosure can have a pH of 12 or less. For example, the aqueous dispersion of the present disclosure can have a pH of greater than 7 up to a pH of 12. In an additional embodiment, the aqueous dispersion of the present disclosure can have a pH of 8 to 12, or a pH of 8 to 11.

For one or more embodiments, the aqueous dispersions can include a colorant. A variety of colors may be used. Examples of colors include, but are not limited to, yellow, magenta, and cyan. As a black coloring agent, carbon black, and a coloring agent toned to black using the yellow/magenta/cyan coloring agents shown below may be used. Colorants, as used herein, include dyes, pigments, and predispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment predispersions. As used herein, a raw pigment is a pigment particle that has had no wet treatments applied to its surface, such as to deposit various coatings on the surface. Raw pigment and treated pigment are further disclosed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Examples of colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

EXAMPLES

Example 1 is an extruder system that included an extruder screw system having a first extruder screw and a second extruder screw. Examples 2-3 are the first extruder screw and the second extruder screw. The two extruder screws were similarly configured. Example 1 included a ZSK-58 Mega-Compounder manufactured by Coperion Werner & Pfleiderer that had twelve 58 mm inner diameter extruder barrels and a 250 hp drive mechanism. Examples 2-3 included screw segments mounted on splined shafts. Examples 2-3 were intermeshing and co-rotated at 1200 rpm. Screw segments are available from Coperion Werner & Pfleiderer. Conventional kneading block element 1 had disks that were 11 mm wide, with 5 disks per 60 mm of screw segment. The data in Table 1A shows properties of Examples 1-3 and extruder screw segments.

Example 1 included a high internal phase emulsion (HIPE) zone. The HIPE zone included Examples 4-16, each respectively being a high internal phase emulsion segment respectively having a kneading block. Each of Examples 4-16 had a plurality of disks. Each of the plurality of disks was 2.5 mm wide. For each of Examples 4-16 there were 18 disks per 60 mm of segment.

TABLE 1A

| | Screw Segment # | Segment Description | Segment pitch (mm) | Segment length (mm) | Number of disks | Angle of disks | Cumulative length (mm) | Cumulative L/D |
|---|---|---|---|---|---|---|---|---|
| Feed zone | 1 | Feed Segment | 80 | 80 | — | — | 80 | 1.38 |
| | 2 | Feed Segment | 80 | 80 | — | — | 160 | 2.76 |
| | 3 | Feed Segment | 60 | 60 | — | — | 220 | 3.79 |
| Conveying zone | 4 | Conveying element | 60 | 60 | — | — | 280 | 4.83 |
| | 5 | Conveying element | 40 | 40 | — | — | 320 | 5.52 |

TABLE 1A-continued

| | Screw Segment # | Segment Description | Segment pitch (mm) | Segment length (mm) | Number of disks | Angle of disks | Cumulative length (mm) | Cumulative L/D |
|---|---|---|---|---|---|---|---|---|
| | 6 | Conveying element | 40 | 40 | — | — | 360 | 6.21 |
| | 7 | Conveying element | 40 | 40 | — | — | 400 | 6.90 |
| Mixing and Melting Zone | 8 | Conventional kneading block 1 | — | 80 | 5 | 45° | 480 | 8.28 |
| | 9 | Conventional kneading block 1 | — | 30 | 5 | 45° | 510 | 8.79 |
| | 10 | Conventional kneading block 1 | — | 30 | 5 | 90° | 540 | 9.31 |
| | 11 | Conventional kneading block 1 | — | 30 | 5 | 90° | 570 | 9.83 |
| | 12 | Conventional kneading block 1 | — | 30 | 5 | 45° Left handed | 600 | 10.34 |
| | 13 | Conventional kneading block 1 | — | 30 | 5 | 45° Left handed | 630 | 10.86 |
| | 14 | Conveying element | 40 | 40 | — | — | 670 | 11.55 |
| | 15 | Conveying element | 40 | 40 | — | — | 710 | 12.24 |
| | 16 | Conveying element | 40 | 40 | — | — | 750 | 12.93 |
| | 17 | Conventional kneading block 1 | — | 30 | 5 | 90° | 780 | 13.45 |
| | 18 | Conventional kneading block 1 | — | 30 | 5 | 90° | 810 | 13.97 |
| | 19 | Conventional kneading block 1 | — | 30 | 5 | 45° Left handed | 840 | 14.48 |
| | 20 | Conventional kneading block 1 | — | 30 | 5 | 90° | 870 | 15.00 |
| | 21 | Conventional kneading block 1 | — | 30 | 5 | 90° | 900 | 15.52 |
| First seal zone | 22 | 1.5 mm Restriction ring | — | 30 | — | — | 930 | 16.03 |
| | 23 | 1.5 mm Restriction ring | — | 30 | — | — | 960 | 16.55 |
| High internal phase emulsion zone | 24 | Turbine mixing element | 225 | 20 | — | — | 980 | 16.90 |
| | 25 | Turbine mixing element | 225 | 20 | — | — | 1000 | 17.24 |
| | 26 | Turbine mixing element | 225 | 20 | — | — | 1020 | 17.59 |
| | 27 | Example 4 | — | 30 | 9 | 90° | 1050 | 18.10 |
| | 28 | Conventional kneading block 1 | — | 30 | 5 | 45° | 1080 | 18.62 |
| | 29 | Example 5 | — | 30 | 9 | 90° | 1110 | 19.14 |
| | 30 | Example 6 | — | 30 | 9 | 90° | 1140 | 19.66 |
| | 31 | Example 7 | — | 60 | 17 | 90° | 1200 | 20.69 |
| | 32 | Example 8 | — | 30 | 9 | 90° | 1230 | 21.21 |
| | 33 | Conventional kneading block 1 | — | 30 | 5 | 45° | 1260 | 21.72 |
| | 34 | Example 9 | — | 30 | 9 | 90° | 1290 | 22.24 |
| | 35 | Example 10 | — | 60 | 17 | 90° | 1350 | 23.28 |
| | 36 | Example 11 | — | 60 | 17 | 90° | 1410 | 24.31 |
| | 37 | Conventional kneading block 1 | — | 30 | 5 | 45° | 1440 | 24.83 |
| | 38 | Conventional kneading block 1 | — | 30 | 5 | 45° | 1470 | 25.34 |

TABLE 1A-continued

|  | Screw Segment # | Segment Description | Segment pitch (mm) | Segment length (mm) | Number of disks | Angle of disks | Cumulative length (mm) | Cumulative L/D |
|---|---|---|---|---|---|---|---|---|
|  | 39 | Example 12 | — | 60 | 17 | 90° | 1530 | 26.38 |
|  | 40 | Example 13 | — | 80 | 23 | 90° | 1610 | 27.76 |
|  | 41 | Example 14 | — | 80 | 23 | 90° | 1690 | 29.14 |
|  | 42 | Example 15 | — | 60 | 17 | 90° | 1750 | 30.17 |
|  | 43 | Example 16 | — | 30 | 9 | 90° | 1780 | 30.69 |
| Second seal zone | 44 | 2.0 mm Restriction ring | — | 30 | — | — | 1810 | 31.21 |
| Dilution zone | 45 | Conveying element | 40 | 40 | — | — | 1850 | 31.90 |
|  | 46 | Conveying element | 40 | 40 | — | — | 1890 | 32.59 |
|  | 47 | Turbine mixing element | 225 | 20 | — | — | 1910 | 32.93 |
|  | 48 | Turbine mixing element | 225 | 20 | — | — | 1930 | 33.28 |
|  | 49 | Turbine mixing element | 225 | 20 | — | — | 1950 | 33.62 |
|  | 50 | Turbine mixing element | 225 Left handed | 20 | — | — | 1970 | 33.97 |
|  | 51 | Turbine mixing element | 225 Left handed | 20 | — | — | 1990 | 34.31 |
|  | 52 | Conveying element | 40 | 40 | — | — | 2030 | 35.00 |
|  | 53 | Conventional kneading block 1 | — | 30 | 5 | 45° | 2060 | 35.52 |
|  | 54 | Conventional kneading block 1 | — | 30 | 5 | 90° | 2090 | 36.03 |
|  | 55 | Conventional kneading block 1 | — | 30 | 5 | 90° | 2120 | 36.55 |
|  | 56 | Conventional kneading block 1 | — | 30 | 5 | 90° | 2150 | 37.07 |
|  | 57 | Turbine mixing element | 225 | 20 | — | — | 2170 | 37.41 |
|  | 58 | Turbine mixing element | 225 | 20 | — | — | 2190 | 37.76 |
|  | 59 | Turbine mixing element | 225 | 20 | — | — | 2210 | 38.10 |
|  | 60 | Turbine mixing element | 225 Left handed | 20 | — | — | 2230 | 38.45 |
|  | 61 | Turbine mixing element | 225 Left handed | 20 | — | — | 2250 | 38.79 |
|  | 62 | Conveying element | 60 | 60 | — | — | 2310 | 39.83 |
|  | 63 | Conventional kneading block 1 | — | 30 | 5 | 45° | 2340 | 40.34 |
|  | 64 | Conventional kneading block 1 | — | 30 | 5 | 45° | 2370 | 40.86 |
|  | 65 | Conventional kneading block 1 | — | 30 | 5 | 45° | 2400 | 41.38 |
|  | 66 | Conventional kneading block 1 | — | 30 | 5 | 90° | 2430 | 41.90 |
|  | 67 | Conventional kneading block 1 | — | 30 | 5 | 90° | 2460 | 42.41 |
|  | 68 | Commercial kneading block 1 | — | 30 | 5 | 90° | 2490 | 42.93 |

TABLE 1A-continued

| Screw Segment # | Segment Description | Segment pitch (mm) | Segment length (mm) | Number of disks | Angle of disks | Cumulative length (mm) | Cumulative L/D |
|---|---|---|---|---|---|---|---|
| 69 | Conventional kneading block 1 | — | 30 | 5 | 90° | 2520 | 43.45 |
| 70 | Conventional kneading block 1 | — | 30 | 5 | 45° | 2550 | 43.97 |
| 71 | Conventional kneading block 1 | — | 30 | 5 | 90° | 2580 | 44.48 |
| 72 | Conventional kneading block 1 | — | 30 | 5 | 45° | 2610 | 45.00 |
| 73 | Conventional kneading block 1 | — | 30 | 5 | 45° | 2640 | 45.52 |
| 74 | Conventional kneading block 1 | — | 30 | 5 | 45° | 2670 | 46.03 |
| 75 | Conventional kneading block 1 | — | 30 | 5 | 45° | 2700 | 46.55 |
| 76 | Conventional kneading block 1 | — | 30 | 5 | 45° | 2730 | 47.07 |
| 77 | Spacer | — | 1.5 | — | — | 2731.5 | 47.09 |
| 78 | Teeth mixing element | 369 | 30 | — | — | 2761.5 | 47.61 |
| 79 | Teeth mixing element | 369 | 30 | — | — | 2791.5 | 48.13 |
| 80 | spacer | — | 1.5 | — | — | 2793 | 48.16 |
| 81 | Conventional kneading block 1 | — | 30 | 5 | 45° | 2823 | 48.67 |
| 82 | Conventional kneading block 1 | — | 30 | 5 | 45° | 2853 | 49.19 |
| 83 | Conveying element | 40 | 40 | — | — | 2893 | 49.88 |
| Third Seal zone  84 | 1.5 mm Restriction ring | — | 30 | — | — | 2923 | 50.40 |

Example 1 was used in continuous process for the production of each of Examples 17-27, each a respective aqueous dispersion. Varying feed rates and ratios of the base polymer Affinity™ (ethylene octene (EO) copolymer available from The Dow Chemical Company) and the stabilizing agent Primacor™ (ethylene acrylic acid (EAA) available from The Dow Chemical Company), as shown in Table 2, were processed via Example 1. For Examples 17-27, the HIPE zone of Example 1 at a temperature of 150° C. to 180° C. The pressure at the output of Example 1 was 400 pounds per square inch gauge (psig) to 600 psig.

TABLE 2

| Example # | Base Polymer Processing Rate (lb/hr) | Base polymer/ stabilizing agent (Weight Ratio) | Aim % Neutralization | Average particle size (microns) | Wt % Solids | pH | Viscosity (cP) | 20 Mesh Filterable Residue |
|---|---|---|---|---|---|---|---|---|
| 17 | 600 | 60:40 | 85 | 1.30 | 41.6 | 10.4 | — | OK |
| 18 | 600 | 70:30 | 85 | 1.20 | 55.6 | 10.2 | — | OK |
| 19 | 600 | 85:15 | 85 | 0.87 | 47.2 | 10.3 | — | OK |
| 20 | 600 | 90:10 | 85 | 0.99 | 42.6 | 10.2 | — | OK |
| 21 | 600 | 85:15 | 60 | 1.30 | 43.0 | 9.4 | — | OK |
| 22 | 600 | 80:20 | 85 | 1.60 | 59.5 | 10.2 | — | OK |
| 23 | 600 | 70:30 | 100 | 0.73 | 55.7 | 12.0 | — | OK |
| 24 | 600 | 70:30 | 85 | 1.10 | 59.9 | 9.94 | 1788 | OK |
| 25 | 700 | 70:30 | 85 | 1.10 | 54.7 | 9.99 | 1292 | OK |
| 26 | 800 | 70:30 | 85 | 1.10 | 54.0 | 9.76 | 1580 | OK |
| 27 | 900 | 70:30 | 85 | 1.10 | 57.9 | 9.74 | 3052 | Tolerable |

Each continuous process included a first injection at 978 mm, a second injection at 1902 mm, a third injection at 2420 mm. Each of the first injections included deionized water and the neutralizing agent, potassium hydroxide. The neutralizing agent was added to provide that each of Examples 17-27 had a respective pH, as shown in Table 2. Each of the second injections included deionized water and EAA. Each of the third injections included deionized water at a temperature of 20° C. to provide that each of Examples 17-27 had the respective weight percent of solids, as shown in Table 2. The average particle size of each of Examples 17-27 was determined by DOWM 102167-E06A.

Comparative Example A is a multiple-screw extruder screw system that had two similarly configured extruder screws. Comparative Example A included a ZSK-58 Mega-Compounder manufactured by Coperion Werner & Pfleiderer that had twelve 58 mm inner diameter barrels and a 250 hp drive mechanism. Comparative Example A included screw segments mounted on splined shafts. The two similarly configured screws were intermeshing and co-rotated at 1200 rpm. Screw segments are available from Coperion Werner & Pfleiderer. Conventional kneading block element 1 had disks that were 11 mm wide, with 5 disks per 60 mm of screw segment. Conventional kneading block element 2 had disks that were 5.4 mm wide, with 10 disks per 60 mm of screw segment. The data in Table 1B shows properties of Comparative Example A and screw segments.

TABLE 1B

| | Screw Segment number | Segment Description | Segment pitch (mm) | Segment length (mm) | Number of disks | Angle of disks | Cumulative length (mm) | Cumulative L/D |
|---|---|---|---|---|---|---|---|---|
| Feed zone | 1 | Conveying element | 80 | 80 | — | — | 80 | 1.38 |
| | 2 | Conveying element | 80 | 80 | — | — | 160 | 2.75 |
| | 3 | Conveying element | 60 | 60 | — | — | 220 | 3.79 |
| Convey zone | 4 | Conveying element | 60 | 60 | — | — | 280 | 4.83 |
| | 5 | Conveying element | 40 | 40 | — | — | 320 | 5.52 |
| | 6 | Conveying element | 40 | 40 | — | — | 360 | 6.21 |
| | 7 | Conveying element | 40 | 40 | — | — | 400 | 6.90 |
| Mixing and Melting Zone | 8 | Conventional kneading block 1 | — | 80 | 5 | 45° | 480 | 8.28 |
| | 9 | Conventional kneading block 1 | — | 30 | 5 | 45° | 510 | 8.79 |
| | 10 | Conventional kneading block 1 | — | 30 | 5 | 90° | 540 | 9.31 |
| | 11 | Conventional kneading block 1 | — | 30 | 5 | 90° | 570 | 9.83 |
| | 12 | Conventional kneading block 1 | — | 30 | 5 | 45° left handed | 600 | 10.34 |
| | 13 | Conventional kneading block 1 | — | 30 | 5 | 45° left handed | 630 | 10.86 |
| | 14 | Conveying element | 40 | 40 | — | — | 670 | 11.55 |
| | 15 | Conveying element | 40 | 40 | — | — | 710 | 12.24 |
| | 16 | Conveying element | 40 | 40 | — | — | 750 | 12.93 |
| | 17 | Conventional kneading block 1 | — | 30 | 5 | 90° | 780 | 13.45 |
| | 18 | Conventional kneading block 1 | — | 30 | 5 | 90° | 810 | 13.97 |
| | 19 | Conventional kneading block 1 | — | 30 | 5 | 45° left handed | 840 | 14.48 |
| | 20 | Conventional kneading block 1 | — | 30 | 5 | 90° | 870 | 15.00 |
| | 21 | Conventional kneading block 1 | — | 30 | 5 | 90° | 900 | 15.52 |

TABLE 1B-continued

| | Screw Segment number | Segment Description | Segment pitch (mm) | Segment length (mm) | Number of disks | Angle of disks | Cumulative length (mm) | Cumulative L/D |
|---|---|---|---|---|---|---|---|---|
| First seal zone | 22 | 1.5 mm Restriction ring | — | 30 | — | — | 930 | 16.03 |
| | 23 | 1.5 mm Restriction ring | — | 30 | — | — | 960 | 16.55 |
| Emulsion zone | 24 | Turbine mixing element | 225 | 20 | — | — | 980 | 16.90 |
| | 25 | Turbine mixing element | 225 | 20 | — | — | 1000 | 17.24 |
| | 26 | Turbine mixing element | 225 | 20 | — | — | 1020 | 17.59 |
| | 27 | Conventional kneading block 1 | — | 30 | 5 | 90° | 1050 | 18.10 |
| | 28 | Conventional kneading block 1 | — | 40 | 5 (3 flight) | 45° | 1090 | 18.79 |
| | 29 | Conventional kneading block 1 | — | 40 | 5 (3 flight) | 45° | 1130 | 19.48 |
| | 30 | Conventional kneading block 1 | — | 40 | 5 (3 flight) | 45° | 1170 | 20.17 |
| | 31 | Conventional kneading block 1 | — | 40 | 5 (3 flight) | 45° | 1210 | 20.86 |
| | 32 | Conventional kneading block 2 | — | 40 | 5 (3 flight) | 60° | 1250 | 21.55 |
| | 33 | Conventional kneading block 2 | — | 40 | 5 (3 flight) | 60° | 1290 | 22.24 |
| | 34 | Conventional kneading block 2 | — | 40 | 5 (3 flight) | 60° | 1330 | 22.93 |
| | 35 | Conventional kneading block 1 | — | 40 | 5 (3 flight) | 45° | 1370 | 23.62 |
| | 36 | Conventional kneading block 2 | — | 40 | 5 (3 flight) | 60° | 1410 | 24.31 |
| | 37 | Commercial kneading block 2 | — | 40 | 5 (3 flight) | 60° | 1450 | 25.00 |
| | 38 | Conventional kneading block 1 | — | 40 | 5 (3 flight) | 45° | 1490 | 25.69 |
| | 39 | Conventional kneading block 1 | — | 40 | 5 (3 flight) | 45° | 1530 | 26.38 |
| | 40 | Transition element | — | 40 | — | — | 1570 | 27.07 |
| | 41 | Conventional kneading block 1 | — | 30 | 5 | 45° | 1600 | 27.59 |
| | 42 | Conventional kneading block 1 | — | 30 | 5 | 45° | 1630 | 28.10 |
| | 43 | Conventional kneading block 1 | — | 30 | 5 | 45° | 1660 | 28.62 |
| | 44 | Conventional kneading block 1 | — | 30 | 5 | 90° | 1690 | 29.14 |
| | 45 | Conventional kneading block 1 | — | 30 | 5 | 90° | 1720 | 29.66 |
| | 46 | Conventional kneading block 1 | — | 30 | 5 | 90° | 1750 | 30.17 |
| Second seal zone | 47 | 2.0 mm Restriction ring | — | 30 | — | — | 1780 | 30.69 |

TABLE 1B-continued

| | Screw Segment number | Segment Description | Segment pitch (mm) | Segment length (mm) | Number of disks | Angle of disks | Cumulative length (mm) | Cumulative L/D |
|---|---|---|---|---|---|---|---|---|
| Dilution zone | 48 | Conveying element | 40 | 40 | — | — | 1820 | 31.38 |
| | 49 | Conveying element | 40 | 40 | — | — | 1860 | 32.07 |
| | 50 | Turbine mixing element | 225 | 20 | — | — | 1880 | 32.41 |
| | 51 | Turbine mixing element | 225 | 20 | — | — | 1900 | 32.76 |
| | 52 | Turbine mixing element | 225 | 20 | — | — | 1920 | 33.10 |
| | 53 | Turbine mixing element | 225 left handed | 20 | — | — | 1940 | 33.45 |
| | 54 | Turbine mixing element | 225 left handed | 20 | — | — | 1960 | 33.79 |
| | 55 | Conveying element | 40 | 40 | — | — | 2000 | 34.48 |
| | 56 | Conventional kneading block 1 | — | 30 | 5 | 45° | 2030 | 35.00 |
| | 57 | Conventional kneading block 1 | — | 30 | 5 | 90° | 2060 | 35.52 |
| | 58 | Conventional kneading block 1 | — | 30 | 5 | 90° | 2090 | 36.03 |
| | 59 | Conventional kneading block 1 | — | 30 | 5 | 90° | 2120 | 36.55 |
| | 60 | Turbine mixing element | 225 | 20 | — | — | 2140 | 36.90 |
| | 61 | Turbine mixing element | 225 | 20 | — | — | 2160 | 37.24 |
| | 62 | Turbine mixing element | 225 | 20 | — | — | 2180 | 37.59 |
| | 63 | Turbine mixing element | 225 left handed | 20 | — | — | 2200 | 37.93 |
| | 64 | Turbine mixing element | 225 left handed | 20 | — | — | 2220 | 38.28 |
| | 65 | Conveying element | 60 | 60 | — | — | 2280 | 39.31 |
| | 66 | Conventional kneading block 1 | — | 30 | 5 | 45° | 2310 | 39.83 |
| | 67 | Conventional kneading block 1 | — | 30 | 5 | 45° | 2340 | 40.34 |
| | 68 | Conventional kneading block 1 | — | 30 | 5 | 45° | 2370 | 40.86 |
| | 69 | Conventional kneading block 1 | — | 30 | 5 | 90° | 2400 | 41.38 |
| | 70 | Conventional kneading block 1 | — | 30 | 5 | 90° | 2430 | 41.90 |
| | 71 | Conventional kneading block 1 | — | 30 | 5 | 90° | 2460 | 42.41 |
| | 72 | Conventional kneading block 1 | — | 30 | 5 | 90° | 2490 | 42.93 |
| | 73 | Conventional kneading block 1 | — | 30 | 5 | 45° | 2520 | 43.45 |
| | 74 | Conventional kneading block 1 | — | 30 | 5 | 90° | 2550 | 43.97 |
| | 75 | Conventional kneading block 1 | — | 30 | 5 | 45° | 2580 | 44.48 |
| | 76 | Conventional kneading block 1 | — | 30 | 5 | 45° | 2610 | 45.00 |
| | 77 | Conventional kneading block 1 | — | 30 | 5 | 45° | 2640 | 45.52 |

TABLE 1B-continued

| Screw Segment number | Segment Description | Segment pitch (mm) | Segment length (mm) | Number of disks | Angle of disks | Cumulative length (mm) | Cumulative L/D |
|---|---|---|---|---|---|---|---|
| 78 | Conventional kneading block 1 | — | 30 | 5 | 45° | 2670 | 46.03 |
| 79 | Conventional kneading block 1 | — | 30 | 5 | 45° | 2700 | 46.55 |
| 80 | spacer | — | 1.5 | — | — | 2701.5 | 46.58 |
| 81 | Conveying element | — | 30 | — | — | 2731.5 | 47.09 |
| 82 | Conveying element | — | 30 | — | — | 2761.5 | 47.61 |
| 83 | spacer | — | 1.5 | — | — | 2763 | 47.64 |
| 84 | Conventional kneading block 1 | — | 30 | 5 | 45° | 2793 | 48.16 |
| 85 | Conventional kneading block 1 | — | 30 | 5 | 45° | 2823 | 48.67 |
| 86 | Conventional kneading block 1 | — | 30 | 5 | 45° | 2853 | 49.19 |
| 87 | Conveying element | 40 | 40 | — | — | 2893 | 49.88 |
| Third Seal zone 88 | 1.5 mm Restriction ring | — | 1.5 | — | — | 2923 | 50.40 |

Comparative Example A was used in continuous process for the production of Comparative Example B, a dispersion. Six hundred pounds per hour of Affinity™ were processed with Primacor™ such that there was an 85 weight percent to 15 weight percent ratio of Affinity™ to Primacor™. For Comparative Example B, the HIPE zone of Comparative Example A was operated at a temperature of 150° C. to 180° C. The pressure at the output of Comparative Example A was 400 psig to 600 psig.

Filterable residues were determined for the continuous process corresponding to the Example 1 system and the Example 19 aqueous dispersion and the continuous process corresponding to the Comparative Example A system and the Comparative Example B aqueous dispersion. The filterable residues were determined by weighing a respective 20 mesh screen, filtering the respective aqueous dispersion through the screen and then reweighing the 20 mesh screen. The data in Tables 3A and 3B shows that when Example 1 and Comparative Example A have the same processing rate that filterable residues are greater in the Comparative Example A system.

TABLE 3A

| System | Example 1 |
|---|---|
| Dispersion | Example 19 or 21 |
| Processing rate (lb/h) | 600 |
| Filterable residues (EAA) | 10 wt % |

TABLE 3B

| System | Comparative Example A |
|---|---|
| Dispersion | Comparative Example B |
| Processing rate (lb/h) | 600 |
| Filterable residues (EAA) | 15 wt % |

Maximum processing rates, as determined by weight percent of filterable residues, were determined for the continuous process corresponding to the Example 1 system and the Example 27 aqueous dispersion and the continuous process corresponding to the Comparative Example A system and the Comparative Example B aqueous dispersion. The data in Tables 4A and 4B shows that Example 1 has a greater maximum processing rate than Comparative Example A.

TABLE 4A

| Example 1 | |
|---|---|
| Maximum processing rate (lb/h) | 900 |

TABLE 4B

| Comparative Example A | |
|---|---|
| Maximum processing rate (lb/h) | 600 |

Startup times, as determined by a time from initial feed of Affinity™ and Primacor™ to a time a visually identified grade of aqueous dispersion was produced for the continuous process corresponding to the Example 1 system and the Example 19 aqueous dispersion and the continuous process corresponding to the Comparative Example A system and the Comparative Example B aqueous dispersion, were determined. The data in Tables 5A and 5B shows that Example 1 has a shorter startup time than Comparative Example A.

TABLE 5A

| Example 1 | |
|---|---|
| Startup time (min) | 10 |

TABLE 5B

| Comparative Example A | |
|---|---|
| Startup time (min) | 30 |

What is claimed is:

1. An extruder system, comprising:
a drive mechanism;
an extruder barrel having an interior wall that defines a volume, and a first inlet and a second inlet through the interior wall into the volume of the extruder barrel and a water inlet;
an extruder screw system having at least one first extruder screw and at least one second extruder screw coupled to the drive mechanism, the first extruder screw and the second extruder screw residing at least partially within the volume defined by the interior wall of the extruder barrel, wherein the drive mechanism rotates the first extruder screw and the second extruder screw, each of the first extruder screw and the second extruder screw including:
a mixing and melting segment to provide a mixing and melting zone for the extruder system;
a high internal phase emulsion segment that includes a kneading block to provide high internal phase emulsion zone for the extruder system, the kneading block having a plurality of disks with surfaces that define a plurality of channels, where water is introduced through the water inlet into the high internal phase emulsion segment and where the plurality of disks of the first extruder screw pass through the plurality of channels of the second screw as the drive mechanism rotates the first extruder screw and the second extruder screw relative each other, each of the plurality of disks has a width (e) between opposite substantially parallel major surfaces of each disk that is 2.0% to 8.5% of a nominal inner diameter of an extruder barrel in which the extruder screw system operates, and each of the plurality of channels has a width between disks that is 3.0% to 9.5% of the nominal inner diameter of the extruder barrel;
a distributing and pumping segment to provide a dilution zone for the extruder system;
a first seal segment between the mixing and melting zone and the high internal phase emulsion zone;
a second seal segment between the high internal phase emulsion zone and the dilution zone; and
a third seal segment at an end distal the dilution zone relative the high internal phase emulsion zone, wherein the first inlet passes into the high internal phase emulsion zone and the second inlet passes into the dilution zone, wherein each of the first seal segment, the second seal segment and the third seal segment includes a restriction ring.

2. A continuous process for the production of an aqueous dispersion, comprising:
providing an extruder system according to claim 1;
introducing one or more base polymers and one or more stabilizing agents into a feed zone of the extruder system;
conveying the one or more base polymers and one or more stabilizing agents to a mixing and melting zone of the extruder system;
melting blending the one or more base polymers in the mixing and melting zone to provide a molten blend of the one or more base polymers and the one or more stabilizing agents;
forming a melt seal in the mixing and melting zone against a first seal zone, the molten blend in the melt seal exerting a predetermined pressure against first seal zone;
passing the molten blend under the predetermined pressure through the first seal zone into a high internal phase emulsion zone;
injecting water and optionally one or more neutralizing agents into the molten blend in the high internal phase emulsion zone through the water inlet;
emulsifying the molten blend and the water optionally in the presence of the neutralizing agent in the high internal phase emulsion zone to form an high internal emulsion;
passing the high internal emulsion through a second seal zone into a dilution zone; and
diluting the high internal emulsion with additional water in the dilution zone to form the aqueous dispersion.

3. The process of claim 2, wherein the one or more stabilizing agents comprises one or more non-polymeric stabilizing agents or one or more polymeric stabilizing agents selected from the group consisting of one or more polar polymeric stabilizing agents, one or more non-polar polymeric stabilizing agents, and combinations thereof.

4. The process of claim 2, wherein injecting water and optionally the neutralizing agent into the molten blend in the high internal phase emulsion zone includes injecting a mass of water equal to 3 to 50 weight percent, based on the weight of the one or more base polymers.

5. The process of claim 2, wherein the aqueous dispersion has an average particle size diameter of less than 5 microns.

6. The process of claim 2, wherein diluting the high internal emulsion with water in the dilution zone to form the aqueous dispersion includes adding water to reduce a packing fraction of particles of the one or more base polymers below a value of 0.74.

7. The process of claim 2, wherein the aqueous dispersion comprises less than 90 percent by weight of water.

8. The process of claim 2, the aqueous dispersion comprises less than 85 percent by weight of solid contents, based on the total weight of the aqueous dispersion.

9. The process of claim 2, wherein diluting the high internal emulsion with water in the dilution zone to form the aqueous dispersion includes injecting a first dilution water to reduce a packing fraction of particles of the one or more base polymers below a value of 0.74; and
injecting a second dilution water having a temperature below the melting point temperature of the one or more base polymers.

10. An aqueous dispersion of one or more base polymers and water obtainable by a process according to claim 2.

11. The system of claim 1, wherein each of the plurality of disks has an outside diameter that is 110% to 190% of a root diameter of the first extruder screw.

12. The system of claim 1, wherein the width of each of the plurality of channels is 105% to 400% of the width (e) between opposite substantially parallel major surfaces of each disk.

13. The system of claim 1, wherein there are at least nine disks for every 30 millimeter length of the kneading block.

14. The system of claim 1, wherein there are at least seventeen disks for every 60 millimeter length of the kneading block.

15. The system of claim 1, wherein the width (e) of each disk is 3 millimeters or less.

16. The system of claim 1, wherein the width (e) of each disk is 2.5 millimeters or less.

17. The system of claim 1, wherein the width of each channel is greater than 3 millimeters.

18. The system of claim 1, wherein each of the plurality of disks is a neutral disk having substantially parallel major surfaces that are perpendicular from a radial surface from which a root diameter of the first extruder screw of the second extruder screw is taken.

19. The system of claim 1, wherein a ratio of a number of disks per unit length times a nominal inner diameter of an extruder barrel is from 16.4 to 17.4.

* * * * *